United States Patent
Li et al.

(10) Patent No.: US 12,501,282 B2
(45) Date of Patent: Dec. 16, 2025

(54) UPLINK COORDINATED COMMUNICATION METHOD AND APPARATUS

(71) Applicant: HUAWEI TECHNOLOGIES CO., LTD., Shenzhen (CN)

(72) Inventors: Yunbo Li, Shenzhen (CN); Genadiy Tsodik, Hod Hasharon (IL); Oren Hencinski, Hod Hasharon (IL); Jian Yu, Shenzhen (CN); Yuchen Guo, Shenzhen (CN); Ming Gan, Shenzhen (CN); Yifan Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 402 days.

(21) Appl. No.: 17/946,685

(22) Filed: Sep. 16, 2022

(65) Prior Publication Data
US 2023/0013161 A1    Jan. 19, 2023

Related U.S. Application Data

(63) Continuation of application No. PCT/CN2021/079962, filed on Mar. 10, 2021.

(30) Foreign Application Priority Data

Mar. 18, 2020   (CN) .......................... 202010195354.1

(51) Int. Cl.
*H04W 72/04*   (2023.01)
*H04W 24/02*   (2009.01)
(Continued)

(52) U.S. Cl.
CPC ........... *H04W 24/02* (2013.01); *H04W 48/16* (2013.01); *H04W 84/12* (2013.01)

(58) Field of Classification Search
CPC ............. H04W 84/12; H04W 74/0808; H04W 74/006; H04W 74/0816; H04W 72/0446;
(Continued)

(56) References Cited

U.S. PATENT DOCUMENTS

| | | | |
|---|---|---|---|
| 2015/0103767 A1* | 4/2015 | Kim | ...................... H04W 74/06 370/329 |
| 2017/0280383 A1* | 9/2017 | Park | ........................ H04W 4/06 |

(Continued)

FOREIGN PATENT DOCUMENTS

| | | | |
|---|---|---|---|
| CN | 106686663 A | 5/2017 | |
| CN | 109076596 A | 12/2018 | |

(Continued)

OTHER PUBLICATIONS

Japanese Office Action issued in corresponding Japanese Application No. 2022-556280, dated Sep. 12, 2023, pp. 1-7.
(Continued)

*Primary Examiner* — Sai Aung
(74) *Attorney, Agent, or Firm* — Hauptman Ham, LLP

(57) ABSTRACT

A communication apparatus method includes a non-transitory memory configured to store non-transitory instructions, and one or more processors coupled with the non-transitory memory. The one or more processors are configured to execute the non-transitory instructions to thereby cause the communication apparatus to generate a trigger frame, and send the trigger frame to the stations. The trigger frame is useable to trigger each station of a plurality of stations in a plurality of basic service sets to send a corresponding trigger based physical protocol data unit, and the trigger frame comprises identification information of the plurality of basic service sets and identification information of the plurality of stations.

11 Claims, 16 Drawing Sheets

(51) Int. Cl.
  *H04W 48/16* (2009.01)
  *H04W 74/08* (2024.01)
  *H04W 84/12* (2009.01)

(58) Field of Classification Search
  CPC ... H04W 72/23; H04W 74/002; H04W 72/04; H04W 72/21; H04W 72/121; H04W 48/16
  See application file for complete search history.

(56) References Cited

U.S. PATENT DOCUMENTS

| | | | | |
|---|---|---|---|---|
| 2017/0367118 | A1* | 12/2017 | Choi | H04W 74/0816 |
| 2018/0146469 | A1* | 5/2018 | Luo | H04W 72/20 |
| 2018/0249501 | A1* | 8/2018 | Ko | H04W 52/243 |
| 2019/0132872 | A1* | 5/2019 | Ko | H04L 47/824 |
| 2020/0037395 | A1* | 1/2020 | Ko | H04W 74/0866 |

FOREIGN PATENT DOCUMENTS

| | | |
|---|---|---|
| CN | 109413672 A | 3/2019 |
| CN | 110831215 A | 2/2020 |
| CN | 111669824 A | 9/2020 |
| EP | 3419349 A1 | 12/2018 |
| GB | 2576723 A | 3/2020 |
| JP | 2020014220 A | 1/2020 |
| WO | 2017030342 A1 | 2/2017 |
| WO | 2018136254 A1 | 7/2018 |
| WO | 2020041093 A1 | 2/2020 |

OTHER PUBLICATIONS

IEEE Std 802.11ac-2013, IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Approved Dec. 11, 2013, total 425 pages.
IEEE P802.11ax/D6.0, Nov. 2019, Draft Standard for Information technology—Tele-communications and Information exchange between systems Local and metropolitan area networks—Specific requirements, Part 11: Wireless LAN Medium Access Control (MAC) and Physical Layer (PHY) Specifications, 780 pages.
International Search Report issued in corresponding International Application No. PCT/CN2021/079962, dated Jun. 1, 2021, pp. 1-12.
India Office Action issued in corresponding India Application No. 202227053244, dated Feb. 10, 2023, pp. 1-6.
Extended European Search Report issued in corresponding European Application No. 21771158.9, dated Jun. 30, 2023, pp. 1-5.
European Office Action issued in corresponding European Application No. 21771158.9, dated Sep. 24, 2025, pp. 1-6.

* cited by examiner

Associated with the first field

UPLINK COORDINATED COMMUNICATION METHOD AND APPARATUS

CROSS-REFERENCE TO RELATED APPLICATIONS

This application is a continuation of International Application No. PCT/CN2021/079962, filed on Mar. 10, 2021, which claims priority to Chinese Patent Application No. 202010195354.1, filed on Mar. 18, 2020. The disclosures of the aforementioned applications are hereby incorporated by reference in their entireties.

TECHNICAL FIELD

This application relates to the field of communication technologies, and in particular, to an uplink coordinated communication method and an apparatus.

BACKGROUND

One area in a mobile communication network may be covered by a plurality of access points (AP). Coordination is performed between adjacent access points, so that system efficiency can be improved, and interference can be reduced. A system including one access point and a plurality of associated stations (STA) is one basic service set (BSS). In a scenario of a plurality of access points, each station selects one of the plurality of access points for association. Stations in a basic service set or stations in different basic service sets contend for channel use permission.

In an uplink coordination scenario of a plurality of access points, the plurality of access points may establish an uplink coordination relationship through negotiation, and exchange association parameters in uplink coordination. For example, the association parameters may include stations participating in coordination, a quantity of spatial streams used by each station, and uplink sending duration. After the plurality of access points complete negotiation, for communication between at least one of the plurality of access points and the station, there is currently no communication solution for the uplink coordination scenario of the plurality of access points. Consequently, the access point and the station cannot communicate in the uplink coordination scenario of the plurality of access points.

For example, when scheduling a station by using a trigger frame, an access point uses an association identifier (AID). The association identifier is unique in one basic service set. However, when stations in a plurality of basic service sets in a coordination set are scheduled by using a trigger frame, association identifiers are not unique because the plurality of basic service sets are included. Stations in all coordinated basic service sets use different association identifiers to avoid a conflict in using association identifiers, leading to a smaller quantity of available association identifiers of stations in each basic service set and a smaller maximum quantity of stations that can be supported in the uplink coordination scenario of the plurality of access points. In addition, access points in all the coordinated basic service sets negotiate for common association identifier space, leading to a complex coordinated transmission procedure and relatively low efficiency of coordinated communication.

SUMMARY

Embodiments of this application provide an uplink coordinated communication method and an apparatus, to implement communication between an access point and a station in an uplink coordination scenario of a plurality of access points.

To resolve the foregoing technical problem, embodiments of this application provide the following technical solutions.

According to a first aspect, an embodiment of this application provides a communication apparatus. The communication apparatus is applied to a station. The communication apparatus includes: a transceiver, configured to receive a trigger frame sent by a first access point AP, where the trigger frame is used to trigger the station to send a trigger based physical protocol data unit PPDU, the station belongs to one of a plurality of basic service sets, and the trigger frame includes identification information of the plurality of basic service sets and identification information of the station; and a processor, configured to determine to send the trigger based physical protocol data unit PPDU. In this solution, the trigger frame generated by the first access point may include the identification information of the plurality of basic service sets and the identification information of the station. The trigger frame may trigger the plurality of BSSs to perform uplink coordination. The trigger frame generated by the first access point may carry an identifier of a triggered station in one BSS. Therefore, the first access point may independently configure identification information of the station associated with the first access point, without ensuring uniqueness of identifiers of stations in the plurality of BSSs. This improves flexibility of configuring the identification information of the triggered station by the first access point, and implements communication between the access point and the station in an uplink coordination scenario of a plurality of access points.

According to a second aspect, an embodiment of this application provides a communication apparatus. The communication apparatus is applied to a first access point AP. The communication apparatus includes: a processor, configured to generate a trigger frame, where the trigger frame is used to trigger each of stations STAs in a plurality of basic service sets BSSs to send a trigger based physical protocol data unit PPDU, and the trigger frame includes identification information of the plurality of basic service sets and identification information of the station; and a transceiver, configured to send the trigger frame to the stations. In this solution, the trigger frame generated by the first access point may include the identification information of the plurality of basic service sets and the identification information of the station. The trigger frame may trigger the plurality of BSSs to perform uplink coordination. The trigger frame generated by the first access point may carry an identifier of a triggered station in one BSS. Therefore, the first access point may independently configure identification information of the station associated with the first access point, without ensuring uniqueness of identifiers of the stations in the plurality of BSSs. This improves flexibility of configuring the identification information of the triggered station by the first access point, and implements communication between the access point and the station in an uplink coordination scenario of a plurality of access points.

In a possible implementation, the identification information of the plurality of basic service sets includes at least one of the following: basic service set colors respectively corresponding to the plurality of basic service sets, access point identifiers respectively corresponding to the plurality of basic service sets, basic service set identifiers respectively corresponding to the plurality of basic service sets, and medium access control MAC addresses of access points respectively corresponding to the plurality of basic service sets, and the identification information of the station includes an association identifier AID of the station. In this solution, the identification information of the basic service set has a plurality of implementations. For example, the identification information of the basic service set includes at least one of the following: a basic service set color, an access point identifier corresponding to the basic service set, a basic service set identifier, and a MAC address of an access point corresponding to the basic service set. Optionally, the identification information of the basic service sets may be partial basic service set identifiers. For example, partial basic service set identifiers are obtained as the identification information of the basic service sets through truncation. For another example, the identification information of the basic service sets may be partial MAC addresses of the access points corresponding to the basic service sets. The identification information of the station has a plurality of implementations. For example, the AID of the STA may be used as the identification information, where the AID of the STA may be allocated to the STA by the first AP, or a MAC address of the STA is used as the identification information of the STA.

In a possible implementation, the trigger frame includes a first field and at least one first user info field corresponding to the first field, the first field includes identification information of at least one of the plurality of basic service sets, one first user info field includes identification information of one triggered station of the at least one basic service set, and the at least one first user info field is located after the first field in the trigger frame. In this solution, the first field and the at least one first user info field corresponding to the first field that are included in the trigger frame may indicate the identification information of the plurality of basic service sets and the identification information of the triggered station, so that a station receiving the trigger frame obtains, by parsing the first field and the first user info field, the identification information of the basic service sets and the identification information of the station that are included in the trigger frame, to accurately determine whether the station is a triggered station. If the station determines that the station is a station triggered (or scheduled) by the trigger frame, the station sends the TB PPDU.

In a possible implementation, the first field is carried in a second user info field in the trigger frame; the first field is carried in a common info field in the trigger frame; or the first field is carried in a coordinated field in the trigger frame. In this solution, the first field is carried in the second user info field. For a location of the first field in the second user info field, in subsequent embodiments, the second user info field may be referred to as a specific user info field, or the second user info field may be referred to as a user info field whose AID 12 subfield is a specific value. For example, the first field may be the last field in the common info field, or the first field is in the middle of the common info field. For example, the coordinated field may be deployed at the last location in the common info field in the trigger frame, or the coordinated field is deployed after the common info field in the trigger frame. Further, the coordinated field is deployed after the common info field in the trigger frame, and the coordinated field is adjacent to the common info field.

In a possible implementation, if the first field is carried in the second user info field in the trigger frame, the at least one basic service set does not include a first basic service set corresponding to the first access point, and the first field is located after a first user info field corresponding to the first basic service set in the trigger frame. In this solution, the first basic service set corresponding to the first access point is not indicated by the first field, so that indication overheads of the trigger frame are reduced.

In a possible implementation, the trigger frame includes a plurality of first fields and at least one first user info field corresponding to each of the plurality of first fields. In this solution, a length of one first field in the trigger frame is fixed. If one first field cannot indicate identification information of all basic service sets used for uplink coordination, a plurality of first fields are included in the trigger frame. The plurality of first fields may indicate the identification information of all the basic service sets used for uplink coordination, so that the trigger frame can indicate the identification information of all the basic service sets used for uplink coordination.

In a possible implementation, if the first field is carried in the common info field in the trigger frame, the common info field includes a trigger type subfield and a trigger dependent common information subfield. The trigger type subfield indicates a trigger type of the trigger frame, and the trigger dependent common information subfield includes the first field. In this solution, the common info field in the trigger frame may be used to carry the first field, so that the common info field in the trigger frame can indicate identification information of all basic service sets used for uplink coordination.

In a possible implementation, if the first field is carried in the coordinated field in the trigger frame, the trigger frame further includes the common info field. The common info field indicates a trigger type of the trigger frame, and the coordinated field is located after the common info field in the trigger frame. In this solution, the coordinated field in the trigger frame may be used to carry the first field, so that the coordinated field in the trigger frame can indicate identification information of all basic service sets used for uplink coordination.

In a possible implementation, the first field includes at least one basic service set identifier subfield, and one basic service set identifier subfield indicates identification information of one of the at least one basic service set. In this solution, the basic service set identifier subfield may indicate identification information of one of the at least one basic service set, so that the station can obtain the identification information of the basic service set by parsing the basic service set identifier subfield.

In a possible implementation, one of the at least one basic service set identifier subfield is a first value, and the first value indicates that the first field does not include a basic service set identifier subfield after the basic service set identifier subfield whose value is the first value. In this solution, the basic service set identifier subfield carrying the first value may be set to indicate identification information of all basic service sets indicated by the first field.

In a possible implementation, the first value is all 0 or all 1. In this solution, when a value carried in a basic service set identifier subfield is all 0 or all 1, it may be determined that the basic service set identifier subfield is the last basic service set identifier subfield, and the first field does not include a basic service set identifier subfield after the basic service set identifier subfield whose value is the first value.

In a possible implementation, the first field includes at least one number of user info subfield, and one number of user info subfield indicates a quantity of first user info fields corresponding to one of the at least one basic service set. In this solution, the station may obtain, by parsing the number of user info subfield in the first field, the quantity of first user info fields corresponding to the basic service set, to obtain a quantity of triggered stations in the basic service set.

In a possible implementation, one of the at least one number of user info subfield is a second value, and the second value indicates that the first field does not include a number of user info subfield after the number of user info subfield whose value is the second value. In this solution, the number of user info subfield carrying the second value may be set to indicate number of user info subfields corresponding to all the basic service sets indicated by the first field.

In a possible implementation, the second value is all 0 or all 1. In this solution, when a value carried in a number of user info subfield is all 0 or all 1, the station may determine that a basic service set corresponding to the number of user info subfield carrying the second value is the last basic service set of the at least one basic service set, the last basic service set does not include a triggered station, and the first field does not include a number of user info subfield after the number of user info subfield carrying the second value.

In a possible implementation, if the first field is carried in the second user info field in the trigger frame, the first field includes an association identifier subfield. The association identifier subfield indicates a type of the first field, and a value of the association identifier subfield is a specific AID. In this solution, the association identifier subfield may indicate the type of the first field, so that after receiving the trigger frame, the station can parse the association identifier subfield included in the first field in the trigger frame to determine the type of the first field. Then the station obtains, from the first field, the identification information of the basic service sets indicated by the first field.

In a possible implementation, the first field includes a number of basic service set subfield, and the number of basic service set subfield indicates a quantity of the at least one basic service set. In this solution, the number of basic service set subfield may be set to indicate the identification information of all the basic service sets indicated by the first field.

According to a third aspect, an embodiment of this application further provides an uplink coordinated communication method. The method includes: A station STA receives a trigger frame sent by a first access point AP. The trigger frame is used to trigger the station to send a trigger based physical protocol data unit PPDU, the station belongs to one of a plurality of basic service sets, and the trigger frame includes identification information of the plurality of basic service sets and identification information of the station. The station determines to send the trigger based physical protocol data unit PPDU. In this solution, the trigger frame generated by the first access point may include the identification information of the plurality of basic service sets and the identification information of the station. The trigger frame may trigger the plurality of BSSs to perform uplink coordination. The trigger frame generated by the first access point may carry an identifier of a triggered station in one BSS. Therefore, the first access point may independently configure identification information of the station associated with the first access point, without ensuring uniqueness of identifiers of stations in the plurality of BSSs. This improves flexibility of configuring the identification information of the triggered station by the first access point, and implements communication between the access point and the station in an uplink coordination scenario of a plurality of access points.

According to a fourth aspect, an embodiment of this application further provides an uplink coordinated communication method. The method includes: A first access point AP generates a trigger frame. The trigger frame is used to trigger each of stations STAs in a plurality of basic service sets BSSs to send a trigger based physical protocol data unit PPDU, and the trigger frame includes identification information of the plurality of basic service sets and identification information of the station. The first access point sends the trigger frame to the stations. In this solution, the trigger frame generated by the first access point may include the identification information of the plurality of basic service sets and the identification information of the station. The trigger frame may trigger the plurality of BSSs to perform uplink coordination. The trigger frame generated by the first access point may carry an identifier of a triggered station in one BSS. Therefore, the first access point may independently configure identification information of the station associated with the first access point, without ensuring uniqueness of identifiers of the stations in the plurality of BSSs. This improves flexibility of configuring the identification information of the triggered station by the first access point, and implements communication between the access point and the station in an uplink coordination scenario of a plurality of access points.

According to a fifth aspect, an embodiment of this application further provides an uplink coordinated communication method. The method includes: A first access point AP generates a physical protocol data unit PPDU. The physical protocol data unit includes a medium access control MAC frame, the physical protocol data unit includes coordination indication information, the coordination indication information indicates whether a target receiving station of the MAC frame includes a communication apparatus, the communication apparatus includes at least one of the following: a second access point and a station associated with the second access point, and the first access point and the second access point belong to a same coordination set. The first access point sends the physical protocol data unit to the communication apparatus. In this solution, the coordination indication information is added to the PPDU, so that a coordination station can determine, through distinguishing as early as possible, whether the MAC frame carried in the PPDU is related to coordination. In this way, the station can reduce power or perform spatial multiplexing as early as possible.

According to a sixth aspect, an embodiment of this application further provides an uplink coordinated communication method. The method includes: A communication apparatus receives a physical protocol data unit PPDU sent by a first access point AP. The physical protocol data unit includes a medium access control MAC frame, the physical protocol data unit includes coordination indication information, the coordination indication information indicates whether a target receiving station of the MAC frame includes the communication apparatus, the communication apparatus includes at least one of the following: a second access point and a station associated with the second access point, and the first access point and the second access point belong to a same coordination set. The communication apparatus determines, based on the coordination indication information, whether to parse the MAC frame. In this solution, the coordination indication information is added to the PPDU, so that a coordination station can determine, through distinguishing as early as possible, whether the MAC frame carried in the PPDU is related to coordination. In this way, the station can reduce power or perform spatial multiplexing as early as possible.

In a possible implementation, the physical protocol data unit includes a signaling SIG field, and the coordination indication information is carried in the signaling field.

In a possible implementation, the coordination indication information occupies 1 bit; and if the coordination indication information carries a first value, the coordination indication information indicates that the target receiving station of the MAC frame includes the communication apparatus; or if the coordination indication information carries a second value, the coordination indication information indicates that the target receiving station of the MAC frame does not include the communication apparatus.

According to a seventh aspect, an embodiment of this application further provides an uplink coordinated communication method. The method includes: A station STA receives a first trigger frame sent by a first access point AP, and receives a second trigger frame sent by at least one second access point. The station and the first access point belong to a same basic service set BSS, and the station and the at least one second access point belong to different basic service sets. The first trigger frame and/or the second trigger frame indicate or indicates the station to send a trigger based physical protocol data unit PPDU. The first trigger frame includes first transmit power of sending the first trigger frame by the first access point and first received power that is estimated by the first access point and at which the trigger based physical protocol data unit sent by the station arrives at the first access point. The station determines second received power of receiving the first trigger frame and the second trigger frame. The station obtains a transmit power adjustment factor. The transmit power adjustment factor is used to adjust transmit power of sending the trigger based physical protocol data unit. The station determines, based on the first transmit power, the first received power, the second received power, and the transmit power adjustment factor, the transmit power of sending the trigger based physical protocol data unit. In this solution, the station may receive trigger frames sent by a plurality of access points. For example, the station receives the first trigger frame sent by the first access point, and receives the second trigger frame sent by the at least one second access point. The station determines the second received power of receiving the first trigger frame and the second trigger frame. The station may determine, based on the first transmit power, the first received power, the second received power, and the transmit power adjustment factor, the transmit power of sending the trigger based physical protocol data unit, so that when a plurality of access points send trigger frames, the station can accurately calculate the transmit power of sending the trigger based PPDU, thereby implementing communication between the access point and the station in an uplink coordination scenario of a plurality of access points.

In a possible implementation, the determining the transmit power of sending the trigger based physical protocol data unit includes: The station determines, in the following manner, the transmit power of sending the trigger based physical protocol data unit: $Pt=Ptar \times P0 \times k/Pr$. Pt represents the transmit power of sending the trigger based physical protocol data unit, Ptar represents the first received power, P0 represents the first transmit power, Pr represents the second received power, k represents the transmit power adjustment factor, × is a multiplication symbol, / is a division symbol, and + is an addition symbol.

In a possible implementation, the determining the transmit power of sending the trigger based physical protocol data unit includes: If the first transmit power is the same as transmit power of sending the second trigger frame by the second access point, the station determines, in the following manner, the transmit power of sending the trigger based physical protocol data unit: $Pt=Ptar \times P0 \times (1+a)/Pr$. Pt represents the transmit power of sending the trigger based physical protocol data unit, Ptar represents the first received power, P0 represents the first transmit power, Pr represents the second received power, a represents the transmit power adjustment factor, × is a multiplication symbol, / is a division symbol, and + is an addition symbol. In this solution, the station may calculate, by using the foregoing formula, the transmit power of sending the trigger based physical protocol data unit, and the station may adjust, by using the transmit power adjustment factor, the transmit power of sending the trigger based physical protocol data unit, so that adjusted transmit power of sending the trigger based physical protocol data unit can enable received power at which the trigger based physical protocol data unit arrives at the first access point to be the first received power, thereby improving accuracy of calculating the transmit power of the trigger based physical protocol data unit in an uplink coordination scenario of a plurality of APs.

In a possible implementation, the determining the transmit power of sending the trigger based physical protocol data unit includes: If the first transmit power is different from transmit power of sending the second trigger frame by the second access point, the station determines, in the following manner, the transmit power of sending the trigger based physical protocol data unit: $Pt=Ptar \times P0 \times (1+a \times b)/Pr$. Pt represents the transmit power of sending the trigger based physical protocol data unit, Ptar represents the first received power, P0 represents the first transmit power, Pr represents the second received power, a represents the transmit power adjustment factor, b represents a ratio of the first transmit power to the transmit power of sending the second trigger frame by the second access point, × is a multiplication symbol, / is a division symbol, and + is an addition symbol. In this solution, the station may calculate, by using the foregoing formula, the transmit power of sending the trigger based physical protocol data unit, and the station may adjust, by using the transmit power adjustment factor, the transmit power of sending the trigger based physical protocol data unit, so that adjusted transmit power of sending the trigger based physical protocol data unit can enable received power at which the trigger based physical protocol data unit arrives at the first access point to be the first received power, thereby improving accuracy of calculating the transmit power of the trigger based physical protocol data unit in an uplink coordination scenario of a plurality of APs.

In a possible implementation, the determining the transmit power of sending the trigger based physical protocol data unit includes: The station determines, in the following manner, the transmit power of sending the trigger based physical protocol data unit: $Tx_{pwr}^{STA}=Tx_{pwr}^{AP}-DL_{RSSI}+Target_{RSSI}+m$. $Tx_{pwr}^{STA}$ represents the transmit power of sending the trigger based physical protocol data unit, $Target_{RSSI}$ represents the first received power, $Tx_{pwr}^{AP}$ represents the first transmit power, $DL_{RSSI}$ represents the second received power, m represents the transmit power adjustment factor, + is an addition symbol, and − is a subtraction symbol. In this solution, the station may calculate, by using the foregoing formula, the transmit power of sending the trigger based physical protocol data unit, and the station may adjust, by using the transmit power adjustment factor, the transmit power of sending the trigger based physical protocol data unit, so that adjusted transmit power of sending the trigger based physical protocol data unit can enable received power at which the trigger based physical protocol data unit arrives at the first access point to be the first received power, thereby improving accuracy of calculating the transmit power of the trigger based physical protocol data unit in an uplink coordination scenario of a plurality of APs.

In a possible implementation, the transmit power adjustment factor is a pre-specified value; or the transmit power adjustment factor is obtained by the station from the first access point. In this solution, pre-specification may be pre-specification of a communication protocol, and the station may obtain the transmit power adjustment factor based on a preconfigured communication protocol. For another example, the first access point may determine the transmit power adjustment factor, and then the first access point sends the transmit power adjustment factor to the station. After the station receives the transmit power adjustment factor, the station may determine the transmit power of sending the trigger based physical protocol data unit. For another example, the second access point may send the transmit power adjustment factor to the station. After the station receives the transmit power adjustment factor, the station may determine the transmit power of sending the trigger based physical protocol data unit.

In a possible implementation, that the station obtains a transmit power adjustment factor includes: The station receives a first medium access control MAC frame sent by the first access point. The first medium access control frame includes second transmit power of sending the first medium access control frame by the first access point. The station determines third received power of receiving the first medium access control frame. The station obtains the transmit power adjustment factor based on the second transmit power, the third received power, and the second received power.

In a possible implementation, that the station obtains a transmit power adjustment factor includes: The station receives a first medium access control frame sent by the first access point, and receives a second medium access control frame sent by the second access point. The first medium access control frame includes second transmit power of sending the first medium access control frame by the first access point, and the second medium access control frame includes third transmit power of sending the second medium access control frame by the second access point. The station determines third received power of receiving the first medium access control frame, and determines fourth received power of receiving the second medium access control frame. The station obtains the transmit power adjustment factor based on the second transmit power, the third transmit power, the third received power, and the fourth received power.

In a possible implementation, that the station obtains a transmit power adjustment factor includes: The station receives a second medium access control frame sent by the second access point. The second medium access control frame includes third transmit power of sending the second medium access control frame by the second access point. The station determines fourth received power of receiving the second medium access control frame. The station obtains the transmit power adjustment factor based on the third transmit power, the fourth received power, and the second received power.

According to an eighth aspect, an embodiment of this application further provides an uplink coordinated communication method. The method includes: A first access point AP generates a first trigger frame. The first trigger frame indicates a station to send a trigger based physical protocol data unit PPDU, and the first trigger frame includes first transmit power of sending the first trigger frame by the first access point and first received power that is estimated by the first access point and at which the trigger based physical protocol data unit sent by the station arrives at the first access point. The first access point sends the trigger frame to the station. In this solution, the first access point may send the first trigger frame to the station, so that when a plurality of access points send trigger frames, the station can accurately calculate the transmit power of sending the trigger based PPDU, thereby implementing communication between the access point and the station in an uplink coordination scenario of a plurality of access points.

In a possible implementation, the method further includes: The first access point sends a first medium access control MAC frame to the station. The first medium access control frame includes second transmit power of sending the first medium access control frame by the first access point.

In a possible implementation, the method further includes: The first access point sends a transmit power adjustment factor to the station. The transmit power adjustment factor is used by the station to determine transmit power of sending the trigger based physical protocol data unit.

According to a ninth aspect, an embodiment of this application further provides a communication apparatus. The communication apparatus is applied to a first access point AP. The communication apparatus includes: a processor, configured to generate a physical protocol data unit PPDU, where the physical protocol data unit includes a medium access control MAC frame, the physical protocol data unit includes coordination indication information, the coordination indication information indicates whether a target receiving station of the MAC frame includes a communication apparatus, and the communication apparatus includes at least one of the following: a second access point and a station associated with the second access point; and a transceiver, configured to send the physical protocol data unit to the communication apparatus.

According to a tenth aspect, an embodiment of this application further provides a communication apparatus. The communication apparatus is applied to a second access point and a station associated with the second access point. The communication apparatus includes: a transceiver, configured to receive a physical protocol data unit PPDU sent by a first access point AP, where the physical protocol data unit includes a medium access control MAC frame, the physical protocol data unit includes coordination indication information, the coordination indication information indicates whether a target receiving station of the MAC frame includes the communication apparatus, and the communication apparatus includes the second access point and the station associated with the second access point; and a processor, configured to determine, based on the coordination indication information, whether the MAC frame is used for coordination between the first access point and the communication apparatus.

According to an eleventh aspect, an embodiment of this application further provides a communication apparatus. The communication apparatus is applied to a first access point AP. The communication apparatus includes: a transceiver, configured to receive a first trigger frame sent by the first access point AP, and receive a second trigger frame sent by at least one second access point, where a station and the first access point belong to a same basic service set BSS, the station and the at least one second access point belong to different basic service sets, the first trigger frame and/or the second trigger frame indicate or indicates the station to send a trigger based physical protocol data unit PPDU, and the first trigger frame includes first transmit power of sending the first trigger frame by the first access point and first received power that is estimated by the first access point and at which the trigger based physical protocol data unit sent by the station arrives at the first access point; and a processor, configured to determine second received power of receiving the first trigger frame and the second trigger frame. The processor is configured to obtain a transmit power adjustment factor. The transmit power adjustment factor is used to adjust transmit power of sending the trigger based physical protocol data unit. The processor is further configured to determine, based on the first transmit power, the first received power, the second received power, and the transmit power adjustment factor, the transmit power of sending the trigger based physical protocol data unit.

According to a twelfth aspect, an embodiment of this application further provides a communication apparatus. The communication apparatus is applied to a first access point AP. The communication apparatus includes: a processor, configured to generate a first trigger frame, where the first trigger frame indicates a station to send a trigger based physical protocol data unit PPDU, and the first trigger frame includes first transmit power of sending the first trigger frame by the first access point and first received power that is estimated by the first access point and at which the trigger based physical protocol data unit sent by the station arrives at the first access point; and a transceiver, configured to send the trigger frame to the station.

In the ninth aspect to the twelfth aspect of this application, the composition modules of the communication apparatus may further perform the steps described in the fifth aspect to the eighth aspect and the various possible implementations. For details, refer to the descriptions in the fifth aspect to the eighth aspect and the various possible implementations.

According to a thirteenth aspect, an AP is provided. The AP includes a processor and a transceiver. Optionally, the AP further includes a memory. The processor, the transceiver, and the memory communicate with each other through internal connection. The processor is configured to perform the method in any one of the second aspect or the possible implementations of the second aspect. The transceiver accepts control of the processor, and is configured to perform signal receiving and sending in the method in any one of the second aspect or the possible implementations of the second aspect. The memory is configured to store instructions. The instructions are invoked by the processor to perform the method in any possible implementation of the fourth aspect, the fifth aspect, the sixth aspect, or the eighth aspect.

According to a fourteenth aspect, a STA is provided. The STA includes a processor and a transceiver. Optionally, the STA further includes a memory. The processor, the transceiver, and the memory communicate with each other through internal connection. The processor is configured to perform the method according to any one of the third aspect or the possible implementations of the third aspect. The transceiver is configured to accept control of the processor, to send and receive signals in the method according to any one of the third aspect or the possible implementations of the third aspect. The memory is configured to store instructions, and the instructions are invoked by the processor, to perform the method according to any one of the third aspect or the possible implementations of the third aspect.

According to a fifteenth aspect, a computer-readable storage medium is provided. The computer-readable storage medium is configured to store a computer program. The computer program includes instructions used to perform the method in any possible implementation of any one of the foregoing aspects.

According to a sixteenth aspect, a computer program is provided. The computer program includes instructions used to perform the method in any possible implementation of any one of the foregoing aspects.

According to a seventeenth aspect, a chip is provided. The chip includes a processing circuit and a transceiver pin. Optionally, the chip further includes a memory. The processing circuit, the transceiver pin, and the memory communicate with each other through internal connection. The processing circuit is configured to perform the method in any one of the first aspect or the possible implementations of the first aspect. The transceiver pin accepts control of the processing circuit, and is configured to perform signal receiving and sending in the method in any one of the first aspect or the possible implementations of the first aspect. The memory is configured to store instructions. The instructions are invoked by the processing circuit to perform the method in any possible implementation of any one of the foregoing aspects.

DESCRIPTION OF EMBODIMENTS

Embodiments of this application provide an uplink coordinated communication method and a communication apparatus, to implement communication between an access point and a station in an uplink coordination scenario of a plurality of access points.

The following describes embodiments of this application with reference to the accompanying drawings.

In the specification, claims, and the accompanying drawings of this application, the terms "first", "second", and the like are intended to distinguish between similar objects but do not necessarily indicate a specific order or sequence. It should be understood that the terms used in such a way are interchangeable in proper circumstances, which is merely a distinguishing manner used when objects having a same attribute are described in embodiments of the present invention. In addition, the terms "include", "comprise", and any other variants thereof are intended to cover the non-exclusive inclusion, so that a process, method, system, product, or device that includes a series of units is not necessarily limited to those units, but may include other units not expressly listed or inherent to such a process, method, product, or device.

The technical solutions in embodiments of this application may be applied to a communication system, and the communication system is applicable to a scenario of coordinated transmission of a plurality of APs. Coordinated transmission of the plurality of APs may be coordinated transmission of a plurality of antennas of a plurality of APs. Coordinated transmission of the plurality of APs may alternatively be coordinated transmission of a plurality of distributed antennas of one AP. For example, a specific implementation scenario of coordinated transmission of the plurality of APs may be D-MIMO transmission. D-MIMO is MIMO in which antennas at a transmit end are distributed antennas, and is also generally referred to as coordinated MIMO or AP joint transmission. D-MIMO is an implementation in AP coordinated transmission. More combined antennas of a plurality of nodes can be fully utilized by using a D-MIMO technology, and a higher rate can be provided by using more spatial streams, or a longer transmission distance can be provided based on channel diversity. Antennas distributed at different nodes can provide better antenna isolation, and channels are more independent of each other. Therefore, more spatial streams can be supported. For example, D-MIMO is communication between an AP group and one or more STAs, and a plurality of APs may be connected in a wired or wireless manner. For another example, in D-MIMO, one access controller (AC) may centrally control a plurality of APs to perform transmission.

Figure 1:
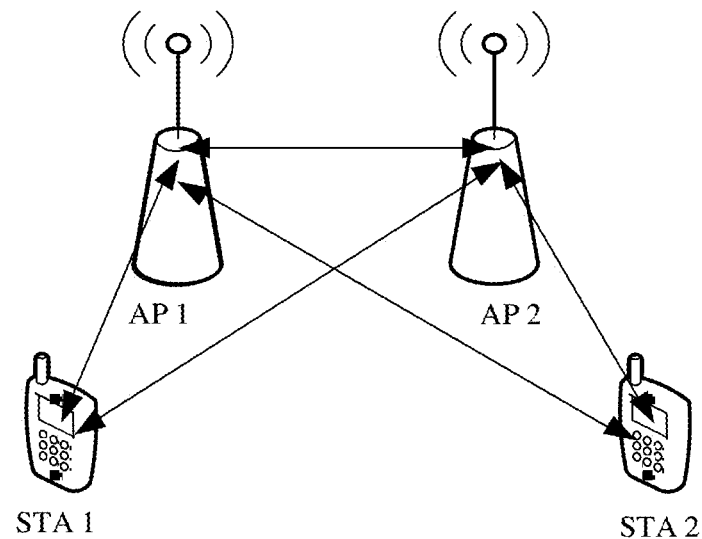
FIG. 1 is a schematic diagram of a composition structure of a communication system according to an embodiment of this application.

As shown in FIG. 1, an example of a communication system provided in an embodiment of this application may include an AP 1, an AP 2, a STA 1, and a STA 2. The AP 1 may be a first access point (AP) in embodiments of this application, and the AP 2 may be a second AP in embodiments of this application. The first AP and the second AP may implement multi-AP coordinated transmission or multi-AP joint transmission. The first AP and the second AP each include at least one antenna, and coordinated transmission of the at least one antenna of the first AP and the at least one antenna of the second AP may also be referred to as distributed multiple-input multiple-output (D-MIMO) transmission or coordinated MIMO transmission. For example, the first AP may be a primary AP, namely, the AP 1 in FIG. 1. The second AP may be a secondary AP, namely, the AP 2 in FIG. 1. The first STA may be the STA 1 in FIG. 1. The second STA may be the STA 2 in FIG. 1. The first AP may communicate with the second AP, for example, in a wired or wireless manner. In this embodiment of this application, an example in which the first AP is a primary AP and the second AP is a secondary AP is used for description. The first AP and the primary AP may alternately be used, and the second AP and the secondary AP may alternately be used. It may be understood that, a quantity of APs and a quantity of STAs in the communication system are merely examples.

An access point is a device in a communication system that connects a station to a communication network. For example, the access point may be a device that supports 802.11 series protocols or a chip that supports 802.11 series protocols. The access point, for example, a device or a chip that supports 802.11be or a device or a chip that supports a next-generation protocol of 802.11be, can serve a station in a wireless local area network. For example, the access point may be referred to as a radio access network (RAN) node (or device), a base station, or the like. Currently, some examples of the access point are: a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a Wi-Fi access point, and another interface device that can work in a wireless environment. Certainly, an apparatus on an access point side in embodiments of this application may alternatively be a chip installed on the foregoing devices.

A station is a device that has a wireless connection function and that can provide information, voice, and/or data connectivity to a user. For example, the station may be a device that supports 802.11 series protocols or a chip that supports 802.11 series protocols. The station can communicate in a wireless local area network, for example, a device or a chip that supports the 802.11be protocol or a device or a chip that supports a next-generation protocol of the 802.11be protocol. The station may also be referred to as a terminal device, user equipment (UE), a mobile station (MS), a mobile terminal (MT), or the like. Currently, some examples of the station include: a mobile phone, a tablet computer, a notebook computer, a handheld computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in smart grid, a wireless terminal in transportation safety, a wireless terminal in smart city, a wireless terminal in smart home, a vehicle-mounted device, and the like. Certainly, an apparatus on a station side in embodiments of this application may alternatively be a chip installed on the foregoing devices.

Certainly, with continuous evolution of wireless local area network application scenarios, the access point and the station in embodiments of this application may be further applied to more scenarios. For example, the access point and the station are sensor nodes (for example, a smart water meter, a smart electricity meter, and a smart air detection node) in a smart city, intelligent devices (for example, an intelligent camera, projector, display screen, television, sound box, refrigerator, and washing machine) in a smart household, nodes in an internet of things, entertainment terminals (for example, wearable devices such as an AR or a VR), intelligent devices (for example, a printer and a projector) in a smart office, an internet of vehicles device in an internet of vehicles, and some infrastructures (for example, a vending machine, a self-service navigation console in a supermarket, a self-service cash register, and a self-service ordering machine) in a daily life scenario. Specific forms of the access point and the station are not specially limited in embodiments of this application. Only examples are described herein. Optionally, the access point and the station in embodiments of this application are further compatible with protocols such as 802.11 ax/ac/n/g/b/a.

The technical solutions of embodiments of this application may be applied to various data processing communication systems such as a wireless local area network (communication system or a cellular system. In addition, the communication systems are further applicable to future-oriented communication technologies to which the technical solutions provided in embodiments of this application are applicable. A system architecture and a service scenario described in embodiments of this application are intended to describe the technical solutions in embodiments of this application more clearly, and do not constitute a limitation on the technical solutions provided in embodiments of this application. A person of ordinary skill in the art may know that with evolution of a network architecture and emergence of a new service scenario, the technical solutions provided in embodiments of this application are also applicable to similar technical problems.

Figure 2:
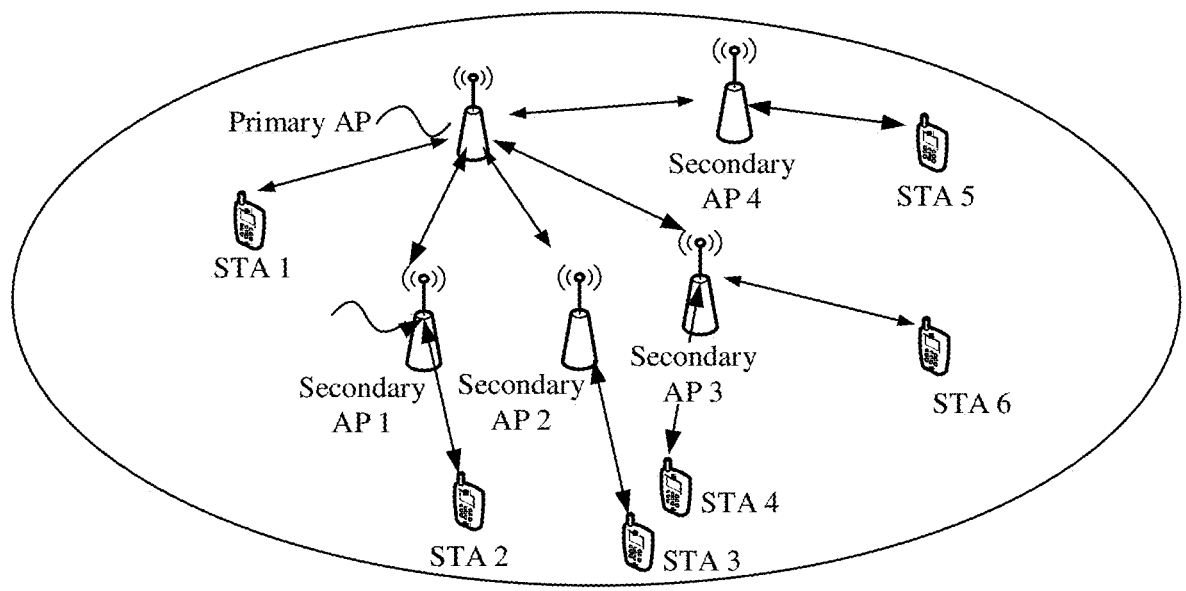
FIG. 2 is a schematic diagram of a structure of another communication system according to an embodiment of this application.

FIG. 2 is a schematic diagram of a structure of another communication system according to an embodiment of this application. The communication system shown in FIG. 2 includes a primary AP, a secondary AP 1, a secondary AP 2, a secondary AP 3, a secondary AP 4, and STAs 1 to 6. In this embodiment of this application, a first AP may be the foregoing primary AP; and a second AP may be the foregoing secondary AP 1, secondary AP 2, secondary AP 3, or secondary AP 4. In FIG. 2, the primary AP may form D-MIMO with the secondary AP 1, the secondary AP 2, the secondary AP 3, and the secondary AP 4; the primary AP may form D-MIMO with the secondary AP 1, the secondary AP 2, and the secondary AP 3; the primary AP may form D-MIMO with the secondary AP 1 and the secondary AP 2; or the primary AP may form D-MIMO with the secondary AP 1.

The communication system provided in embodiments of this application may communicate by using a plurality of Wi-Fi standards. The plurality of Wi-Fi standards may include an existing Wi-Fi standard of high throughput (HT), very high throughput (VHT), or high efficiency (HE), or a next-generation Wi-Fi standard (also referred to as 802.11ax or Wi-Fi 6), for example, extremely high throughput (EHT) or very high efficiency (VHE). In subsequent embodiments, the solutions of embodiments of this application are described by using a next-generation Wi-Fi standard named EHT (also referred to as 802.11be or Wi-Fi 7) as an example.

The following further describes the solutions in embodiments of this application with reference to more accompanying drawings.

Embodiment 1

Figure 3:
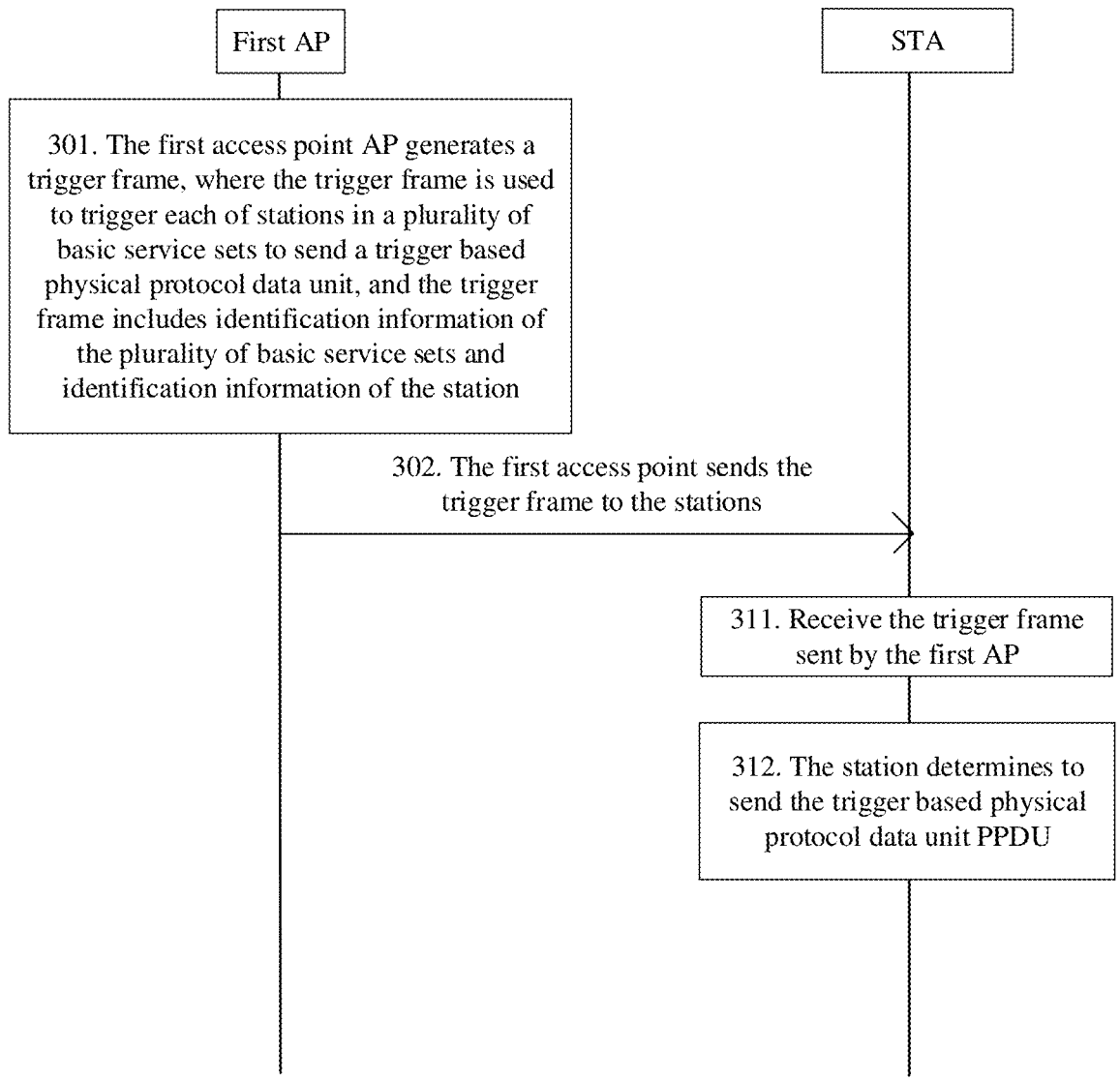
FIG. 3 is a schematic block diagram of a procedure of an uplink coordinated communication method according to an embodiment of this application.

In this embodiment of this application, FIG. 3 is a schematic flowchart of an uplink coordinated communication method according to an embodiment of this application. The uplink coordinated communication method provided in this embodiment of this application mainly includes the following steps.

301. A first access point AP generates a trigger frame, where the trigger frame is used to trigger each of stations STAs in a plurality of BSSs to send a trigger based (trigger based, TB) physical protocol data unit (PPDU), and the trigger frame includes identification information of the plurality of basic service sets and identification information of the station.

In this embodiment of this application, the first access point belongs to a first BSS, the first access point is associated with one or more stations STAs in the first BSS, the first BSS is one of the plurality of BSSs, the first access point may independently configure identification information of a triggered station in the first BSS for the station, and the first access point is not affected by configuring identification information of a station by another access point. For example, the trigger frame may be an uplink coordinated (UL coordinated) trigger frame, or the trigger frame may be a type of frame newly defined by the first access point. An implementation of the trigger frame is not limited.

In this embodiment of this application, the trigger frame includes the identification information of the plurality of basic service sets. The identification information of the basic service set is used to uniquely identify one basic service set, and the trigger frame includes identification information of all basic service sets used for uplink coordination. For example, if N basic service sets are used for uplink coordination, the trigger frame includes identification information of the N basic service sets, where N may be equal to 1, 2, or a larger positive integer. In addition, in addition to the identification information of the N basic service sets, the trigger frame may include identification information of a triggered station in each of the plurality of basic service sets. For example, the first access point belongs to the first BSS, and the trigger frame may trigger M stations in the first BSS. In this case, the trigger frame includes identification information of the M stations in the first BSS. The first access point may configure, for the M stations in the first BSS, identification information corresponding to each station. The identification information of the station that is included in the trigger frame indicates a triggered station. In this embodiment of this application, the trigger frame includes the identification information of the plurality of basic service sets and the identification information of the triggered station included in each basic service set. One basic service set includes partial triggered stations. Triggered stations can be distinguished from each other based on an identifier of a basic service set and an identifier of a station in the basic service set. There is no confusion even if different basic service sets include stations with a same identifier. Therefore, the first access point may independently configure identification information of a station, and the identification information of the station is unique only in an associated basic service set, without being unique in the plurality of basic service sets, so that flexibility of configuring the identification information of the station by the access point is improved. In addition, in this embodiment of this application, a common station identifier set (or a station identifier set) is not negotiated for in advance before coordinated transmission, so that transmission efficiency is improved, and signaling overheads are reduced.

In this embodiment of this application, the trigger frame may be used to trigger the station to send the trigger based physical protocol data unit (English abbreviation: TB PPDU). The physical protocol data unit may also be referred to as a data packet. The trigger based PPDU is a PPDU that is scheduled by the trigger frame and that carries uplink data. It may be understood that the trigger frame may be generated by any one of a plurality of APs. In this embodiment of this application, an example in which the first AP is an AP that generates the trigger frame is described. The first AP may be referred to as a primary AP, and another AP such as a second AP is referred to as a secondary AP.

In some embodiments of this application, the identification information of the plurality of basic service sets includes at least one of the following: basic service set colors (BSS Color) respectively corresponding to the plurality of basic service sets, access point identifiers respectively corresponding to the plurality of basic service sets, basic service set identifiers respectively corresponding to the plurality of basic service sets, and medium access control (MAC) addresses of access points respectively corresponding to the plurality of basic service sets.

The identification information of the station includes an association identifier AID of the station.

Specifically, the identification information of the basic service set has a plurality of implementations. For example, the identification information of the basic service set includes at least one of the following: a basic service set color, an access point identifier corresponding to the basic service set, a basic service set identifier, and a MAC address of an access point corresponding to the basic service set. Optionally, the identification information of the basic service sets may be partial basic service set identifiers. For example, partial basic service set identifiers are obtained as the identification information of the basic service sets through truncation. For another example, the identification information of the basic service sets may be partial MAC addresses of the access points corresponding to the basic service sets. In subsequent embodiments, an example in which the identification information of the basic service set is a basic service set color is described.

Specifically, a set including a plurality of APs may be referred to as one AP group or one coordination set. Each AP and a station associated with the AP constitute one BSS. Because one basic service set includes one AP, a basic service set color of a basic service set may be used as identification information of each basic service set. A specific implementation form of the identification information of the plurality of basic service sets is not specifically limited in this embodiment of this application.

There are a plurality of implementations for the identification information of the station. For example, the AID of the STA may be used as the identification information of the STA, and the AID of the STA may be allocated by the first AP to the STA, or the MAC address of the STA is used as the identification information of the STA. A specific implementation form is used for the identification information of the STA is not specifically limited in this embodiment of this application.

In some embodiments of this application, the trigger frame includes a first field and at least one first user info field corresponding to the first field, the first field includes identification information of at least one of the plurality of basic service sets, one first user info field includes identification information of one triggered station of the at least one basic service set, and the at least one first user info field is located after the first field in the trigger frame.

The following describes a frame structure of the trigger frame. A corresponding field is used in the trigger frame to carry the identification information of the plurality of basic service sets and the identification information of the station. A field included in the trigger frame may also be referred to as a unit. The field is used only for description herein.

Figure 4:
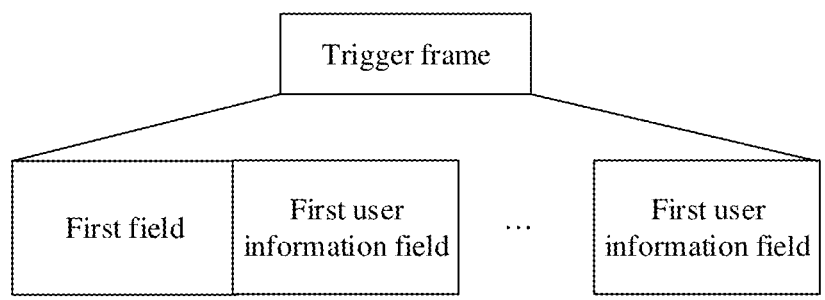
FIG. 4 is a schematic diagram of a frame structure of a trigger frame according to an embodiment of this application.

FIG. 4 is a schematic diagram of a frame structure of a trigger frame according to an embodiment of this application. The trigger frame includes a first field and at least one first user information (user info) field corresponding to the first field. In FIG. 4, an example in which the trigger frame includes a plurality of first user info fields is described. The first field is particularly one or more fields in the trigger frame, and the first user info field is one or more user info fields in the trigger frame. Further, the first field includes identification information of at least one of the plurality of basic service sets. For example, if T basic service sets are used for uplink coordination, the first field may include identification information of (T−1) basic service sets. One first user info field includes identification information of one triggered station in one basic service set. For example, if one basic service set includes S triggered stations, S first user info fields indicate identification information of the S stations. In this embodiment of this application, the first field and the at least one first user info field corresponding to the first field that are included in the trigger frame may indicate the identification information of the plurality of basic service sets and the identification information of the triggered station, so that a station receiving the trigger frame obtains, by parsing the first field and the first user info field, the identification information of the basic service sets and the identification information of the station that are included in the trigger frame, to accurately determine whether the station is a triggered station. If the station determines that the station is a station triggered (or scheduled) by the trigger frame, the station sends the TB PPDU.

In some embodiments of this application, as shown in FIG. 4, the at least one first user info field corresponding to the first field is located after the first field in the trigger frame. To be specific, the first field in the trigger frame is first parsed by the station, and only after the first field is parsed, the station can continue to obtain, by parsing the trigger frame based on an indication of the first field, the at least one first user info field corresponding to the first field.

For example, the trigger frame may include a first field and a plurality of first user info fields corresponding to the first field. The first field may be used to carry identification information of at least one of the plurality of basic service sets. The first field further corresponds to at least one first user info field. Each of all stations triggered by the trigger frame may use one first user info field. The first access point may include an identifier of one triggered station in one first user info field.

Further, the trigger frame includes a first field, and the first field has a plurality of implementations. In some embodiments of this application, the first field is carried in a second user info field in the trigger frame; the first field is carried in a common info field in the trigger frame; or the first field is carried in a coordinated field in the trigger frame.

In an example, the first field may be carried in the second user info field in the trigger frame, the second user info field is one or more user info fields in the trigger frame, the second user info field and the first user info field are different user info fields, and the second user info field and the first user info field are named differently based on different carried information content. The first field is carried in the second user info field. A location of the first field in the second user info field is not limited herein. For example, in subsequent embodiments, the second user info field may be referred to as a specific user info field, or the second user info field may be referred to as a user info field whose AID 12 subfield is a specific value.

In another example, the trigger frame includes the common information (common info) field, and the first field may be carried in the common info field in the trigger frame. For example, the first field may be the last field in the common info field, or the first field is in the middle of the common info field. A location of the first field in the common info field is not limited herein.

In still another example, the trigger frame includes the coordination (coordinated) field, and the first field may be carried in the coordinated field in the trigger frame. For example, the coordinated field may be a newly added field in the trigger frame. For example, the coordinated field may be deployed at the last location in the common info field in the trigger frame, or the coordinated field is deployed after the common info field in the trigger frame. Further, the coordinated field is deployed after the common info field in the trigger frame, and the coordinated field is adjacent to the common info field. An implementation of the coordinated field is not limited, and a deployment location of the first field in the coordinated field is not limited.

Figure 5:
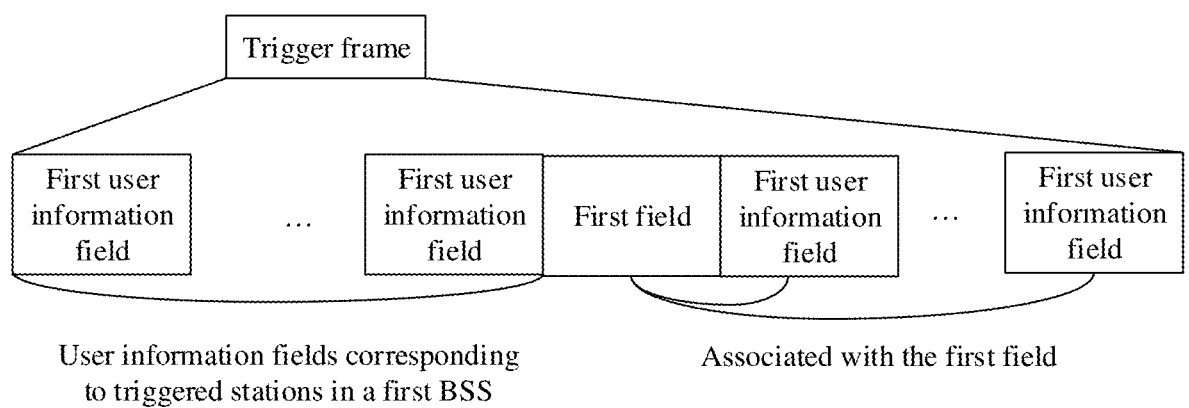
FIG. 5 is a schematic diagram of a frame structure of another trigger frame according to an embodiment of this application.

In some embodiments of this application, the first field has a plurality of specific implementations in the trigger frame. The following provides detailed example descriptions. Optionally, as shown in FIG. 5, the at least one basic service set does not include a first basic service set corresponding to the first access point, and the first field is located after a first user info field corresponding to the first basic service set in the trigger frame.

For example, if the first field is carried in the second user info field in the trigger frame, a basic service set corresponding to the first access point is the first basic service set, the first field includes identification information of at least one of the plurality of basic service sets, and the at least one basic service set does not include the first basic service set, in other words, identification information of the first basic service set is not carried in the first field. For example, the first basic service set may be referred to as a transmitting basic service set (transmitting BSS). The transmitting basic service set may also be referred to as a primary BSS. The transmitting basic service set is a BSS corresponding to an AP that initiates coordination or a BSS corresponding to an AP that establishes a coordination set. The first basic service set may be indicated by a sending address in a MAC frame header or a basic service set color (BSS color) in a signaling (SIG) field in a physical protocol data unit. When the identification information of the first basic service set is not indicated by the first field, as shown in FIG. 5, in the trigger frame, the first field is located after the first user info field corresponding to the first basic service set. For example, if the first basic service set corresponds to P first user info fields, the first field may be located after the P first user info fields. Therefore, after completing parsing the P first user info fields corresponding to the first basic service set, the station may determine the first field after the P first user info fields. For example, the first field is adjacent to the P first user info fields. A value of P may be greater than or equal to 1. This is not limited herein. In this embodiment of this application, the first basic service set corresponding to the first access point is not indicated by the first field, so that indication overheads of the trigger frame are reduced.

In other embodiments of this application, the first basic service set corresponding to the first access point may alternatively be indicated by the first field, so that the station can determine, by parsing the first field in the trigger frame, the first basic service set corresponding to the first access point, and determine a triggered station in the first basic service set by parsing the at least one first user info field corresponding to the first field in the trigger frame.

In some embodiments of this application, the trigger frame includes a plurality of first fields and at least one first user info field corresponding to each of the plurality of first fields.

Figure 6:
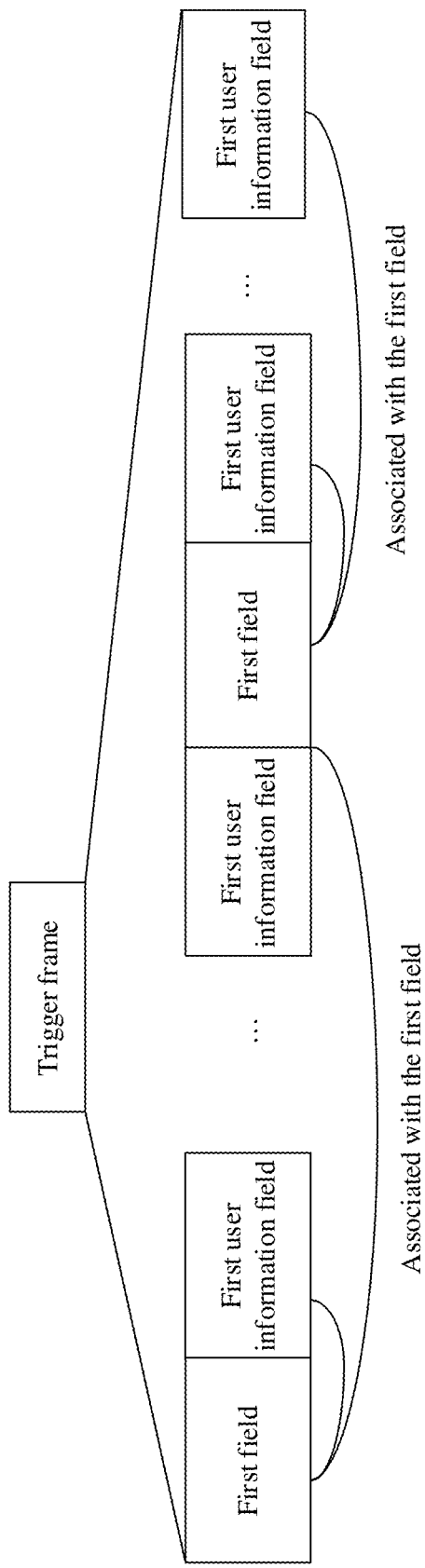
FIG. 6 is a schematic diagram of a frame structure of another trigger frame according to an embodiment of this application.

Specifically, a length of one first field in the trigger frame is fixed. If one first field cannot indicate identification information of all basic service sets used for uplink coordination, a plurality of first fields are included in the trigger frame. The plurality of first fields may indicate the identification information of all the basic service sets used for uplink coordination, so that the trigger frame can indicate the identification information of all the basic service sets used for uplink coordination. For example, as shown in FIG. 6, the trigger frame includes two first fields, and six basic service sets are used for uplink coordination. In this case, one first field may indicate identification information of four basic service sets used for uplink coordination, and the other first field may indicate identification information of two basic service sets used for uplink coordination. In addition, in an example in which the trigger frame includes two first fields, the trigger frame further includes at least one first user info field corresponding to each of the two first fields. For example, if one first field corresponds to T first user info fields, the trigger frame includes 2T first user info fields.

For example, the first field may be the second user info field in the trigger frame. Because a length of the second user info field is fixed, when one second user info field is insufficient to carry identification information of all coordinated BSSs, a plurality of second user info fields of specific AIDs may be alternatively carried in one trigger frame. After a second user info field carrying a specific AID and a first user info field indicated by the second user info field, a second user info field of another specific AID is carried. The second user info field carrying another specific AID indicates a batch of first user info fields after the second user info field carrying the another specific AID. In this embodiment of this application, by using a plurality of second user info fields, the trigger frame may indicate the identification information of all the basic service sets used for uplink coordination.

Figure 7:
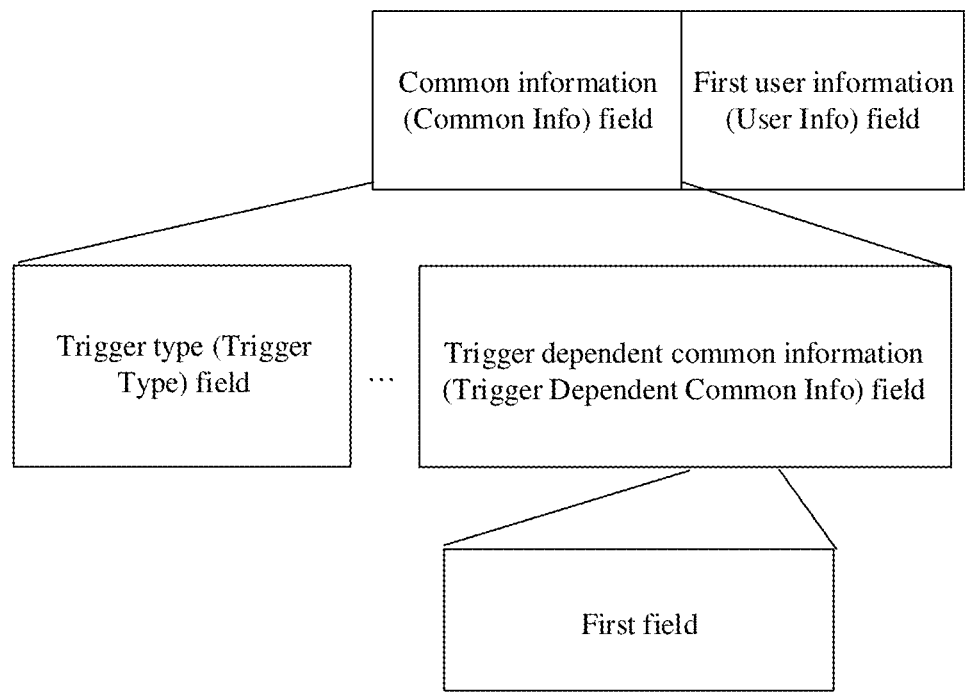
FIG. 7 is a schematic diagram of a composition structure of a common info field according to an embodiment of this application.

In some embodiments of this application, as shown in FIG. 7, if the first field is carried in the common info field in the trigger frame, the common info field includes a trigger type subfield and a trigger dependent common information (Trigger Dependent Common Info) subfield. The trigger type subfield indicates a trigger type of the trigger frame, and the trigger dependent common information subfield includes the first field.

Specifically, the trigger frame includes the common info field, and the first field may be carried by using the common info field. For example, the common info field includes the trigger type subfield and the trigger dependent common information subfield. The trigger type subfield may indicate the type of the trigger frame. For example, the trigger type subfield may indicate that the trigger frame is an uplink coordinated (UL coordinated) trigger frame. The first field may be carried in the trigger dependent common information subfield. For example, the first field may be a part of the trigger dependent common information subfield, or the first field may be the trigger dependent common information subfield. This is not limited herein. In this embodiment of this application, the common info field in the trigger frame may be used to carry the first field, so that the common info field in the trigger frame can indicate identification information of all basic service sets used for uplink coordination.

In some embodiments of this application, if the first field is carried in the coordinated field in the trigger frame, the trigger frame further includes the common info field. The common info field indicates a trigger type of the trigger frame, and the coordinated field is located after the common info field in the trigger frame.

Figure 8:
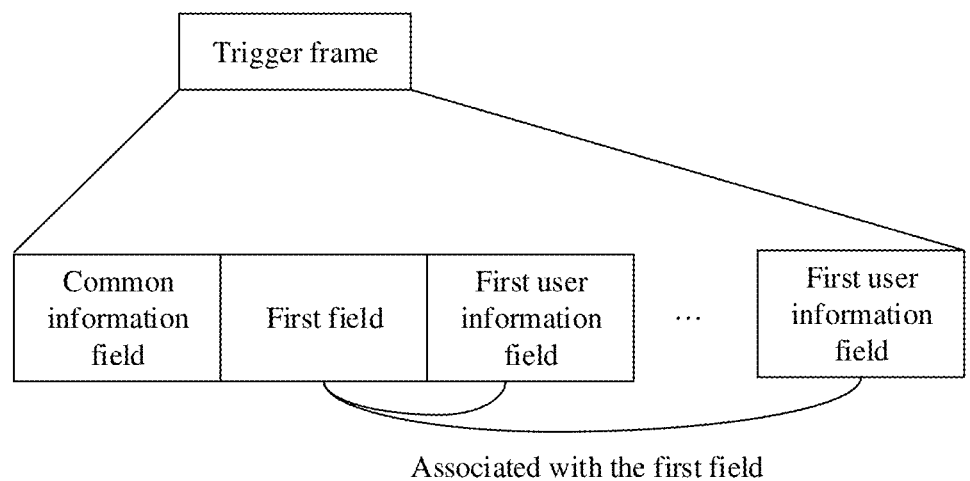
FIG. 8 is a schematic diagram of a frame structure of another trigger frame according to an embodiment of this application.

The first field may be the coordinated field in the trigger frame, the coordinated field may be a field added to the trigger frame, and the first field may be carried in the coordinated field. For example, the first field may be a part of the coordinated field, or the first field may be the coordinated field. This is not limited herein. As shown in FIG. 8, for example, the first field is the coordinated field. The coordinated field may be located after the common info field in the trigger frame. For example, the coordinated field is adjacent to the common info field. In this embodiment of this application, the coordinated field in the trigger frame may be used to carry the first field, so that the coordinated field in the trigger frame can indicate identification information of all basic service sets used for uplink coordination.

The foregoing describes the manner of carrying the first field in the trigger frame. The following describes a composition structure of the first field by using examples.

Figure 9:
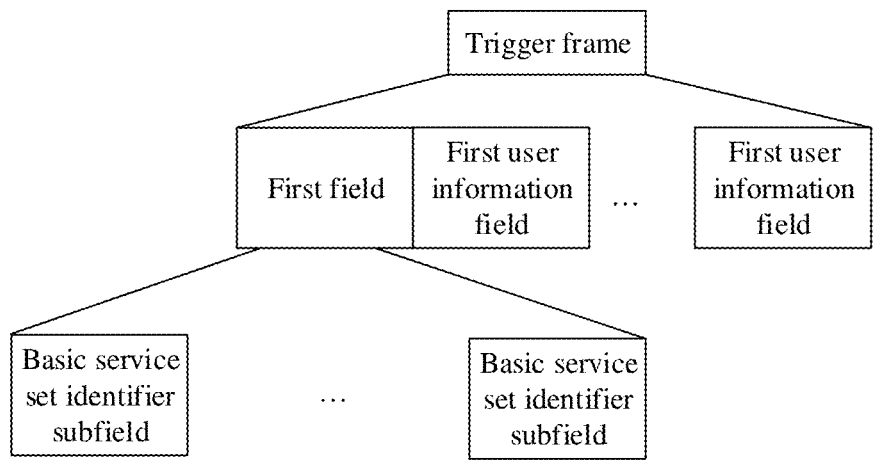
FIG. 9 is a schematic diagram of a frame structure of another trigger frame according to an embodiment of this application.

In some embodiments of this application, as shown in FIG. 9, the first field includes at least one basic service set identifier subfield, and one basic service set identifier subfield indicates identification information of one of the at least one basic service set.

Specifically, the first field may include one basic service set identifier subfield, and the basic service set identifier subfield may indicate identification information of one basic service set. For another example, the first field may include two basic service set identifier subfields, one basic service set identifier subfield may indicate identification information of one basic service set, and the other basic service set identifier subfield may indicate identification information of another basic service set. In this embodiment of this application, the basic service set identifier subfield may indicate identification information of one of the at least one basic service set, so that the station can obtain the identification information of the basic service set by parsing the basic service set identifier subfield.

Further, in some embodiments of this application, the first field includes the at least one basic service set identifier subfield, and a specific value such as a first value may be further set in the at least one basic service set identifier subfield. The first value indicates that the first field does not include a basic service set identifier subfield after a basic service set identifier subfield whose value is the first value, in other words, the basic service set identifier subfield whose value is the first value is the last basic service set identifier subfield in the first field. After receiving the trigger frame, the station may parse the at least one basic service set identifier subfield in the first field. If the station obtains, by parsing the first field, the basic service set identifier subfield carrying the first value, the station may determine that a basic service set indicated by the basic service set identifier subfield carrying the first value does not include a triggered station, and the first field does not include a basic service set identifier subfield after the basic service set identifier subfield carrying the first value. In this embodiment of this application, the basic service set identifier subfield carrying the first value may be set to indicate identification information of all basic service sets indicated by the first field.

In some embodiments of this application, the first value may have a plurality of manners. For example, the first value is all 0 or all 1. To be specific, when a value carried in a basic service set identifier subfield is all 0 or all 1, it may be determined that the basic service set identifier subfield is the last basic service set identifier subfield, and the first field does not include a basic service set identifier subfield after the basic service set identifier subfield whose value is the first value. The first value in this embodiment of this application is not limited to the foregoing example.

Figure 10:
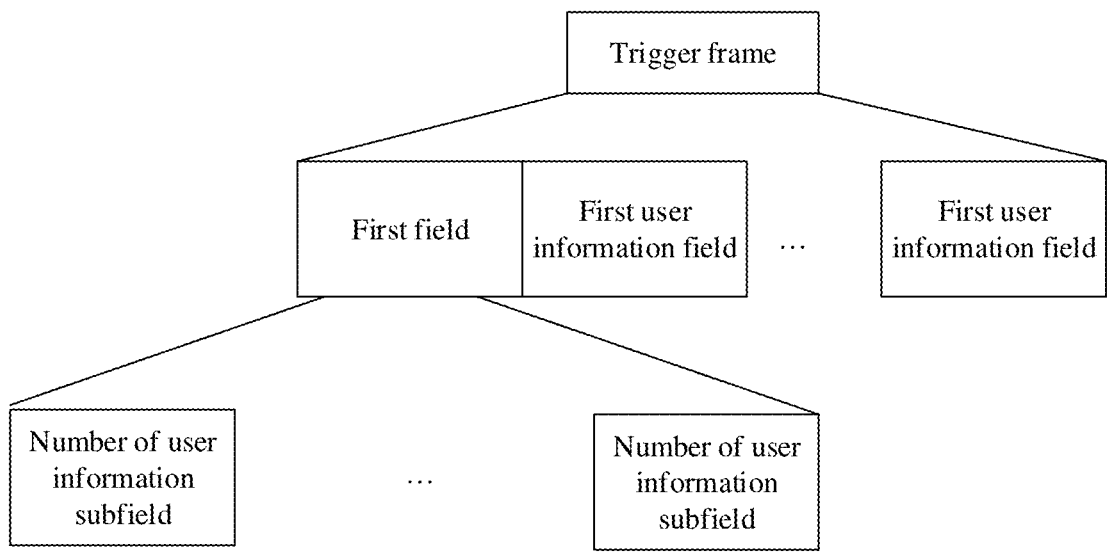
FIG. 10 is a schematic diagram of a frame structure of another trigger frame according to an embodiment of this application.

In some embodiments of this application, as shown in FIG. 10, the first field includes at least one number of user info (number of user info for BSS color) subfield.

One number of user info subfield indicates a quantity of first user info fields corresponding to one of the at least one basic service set.

The trigger frame may further indicate a quantity of first user info fields corresponding to the basic service set used for uplink coordination. It may be understood that a quantity of first user info fields corresponding to one basic service set is equal to a quantity of triggered stations in the basic service set. For example, the first field may include one number of user info subfield, to indicate a quantity of first user info fields corresponding to one basic service set. The first field may include two number of user info subfields, to indicate a quantity of first user info fields corresponding to each of the two basic service sets. Therefore, in this embodiment of this application, a quantity of basic service sets whose identification information is indicated by the first field denotes how many user info subfields need to indicate a quantity of first user info fields corresponding to the corresponding basic service sets. In this embodiment of this application, the station may obtain, by parsing the number of user info subfield in the first field, the quantity of first user info fields corresponding to the basic service set, to obtain a quantity of triggered stations in the basic service set.

For example, the first field includes at least one basic service set identifier subfield and at least one number of user info subfield.

One basic service set identifier subfield indicates identification information of one of at least one basic service set. One number of user info subfield indicates a quantity of first user info fields corresponding to one of the at least one basic service set.

Specifically, the first field may include the basic service set identifier subfield and the number of user info subfield. The two fields may indicate identification information of a basic service set and a quantity of first user info fields corresponding to the basic service set.

Further, in some embodiments of this application, the first field includes at least one number of user info subfield, one of the at least one number of user info subfield is a second value, and the second value indicates that the first field does not include a number of user info subfield after the number of user info subfield whose value is the second value.

Specifically, after receiving the trigger frame, the station may parse the at least one number of user info subfield in the first field. If the station obtains, by parsing the first field, the number of user info subfield carrying the second value, the station may determine that a basic service set corresponding to the number of user info subfield carrying the second value user info is the last basic service set in the at least one basic service set, the last basic service set does not include a triggered station, and the first field does not include a number of user info subfield after the number of user info subfield carrying the second value. In this case, the station may no longer parse the first field. In this embodiment of this application, the number of user info subfield carrying the second value may be set to indicate number of user info subfields corresponding to all the basic service sets indicated by the first field.

In some embodiments of this application, the second value may have a plurality of manners. For example, the second value is all 0 or all 1. To be specific, when a value carried in a number of user info subfield is all 0 or all 1, the station may determine that a basic service set corresponding to the number of user info subfield carrying the second value is the last basic service set in the at least one basic service set, the last basic service set does not include a triggered station, and the first field does not include a number of user info subfield after the number of user info subfield carrying the second value. The second value in this embodiment of this application is not limited to the foregoing example.

Figure 11:
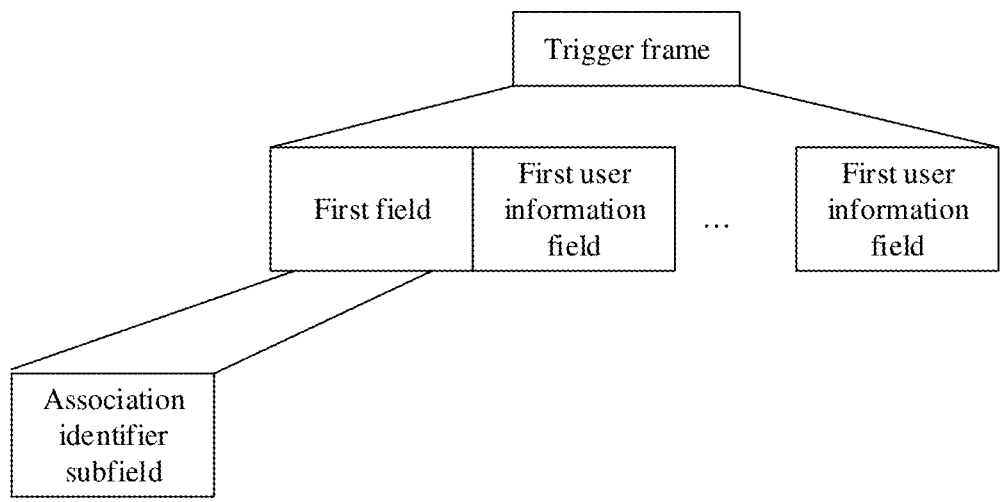
FIG. 11 is a schematic diagram of a frame structure of another trigger frame according to an embodiment of this application.

In some embodiments of this application, as shown in FIG. 11, if the first field is carried in the second user info field in the trigger frame, the first field includes an association identifier subfield. The association identifier subfield indicates a type of the first field, and a value of the association identifier subfield is a specific AID.

Specifically, if the first field is carried in the second user info field in the trigger frame, the first field further indicates the type of the first field. For example, the first field includes the association identifier subfield, and the value of the association identifier subfield is a specific AID. For example, the specific AID may be 2044, 2008, or 2047. A specific value of the association identifier subfield is not limited. In subsequent embodiments, an example in which the specific AID is 2044 is described. In this embodiment of this application, the association identifier subfield may indicate the type of the first field, so that after receiving the trigger frame, the station can parse the association identifier subfield included in the first field in the trigger frame to determine the type of the first field. Then the station obtains, from the first field, the identification information of the basic service sets indicated by the first field.

Figure 12:
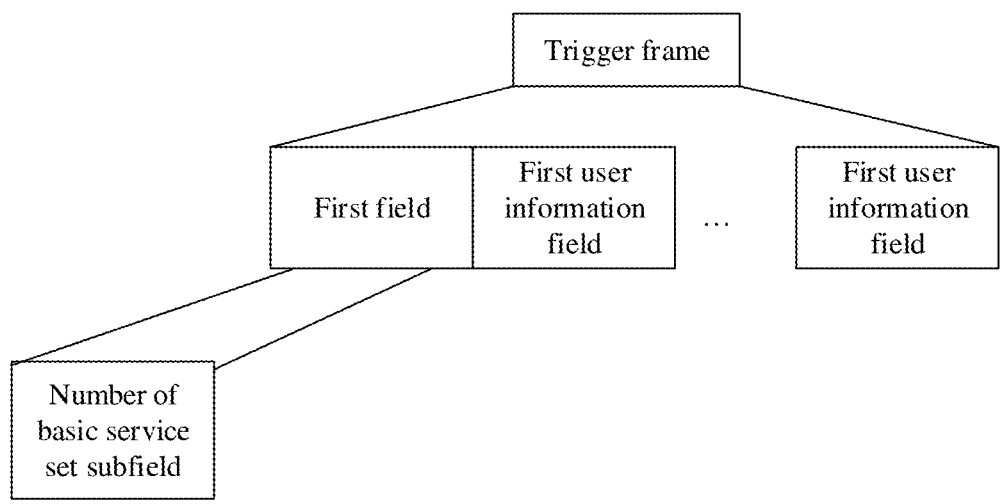
FIG. 12 is a schematic diagram of a frame structure of another trigger frame according to an embodiment of this application.

In some embodiments of this application, as shown in FIG. 12, the first field includes a number of basic service set subfield, and the number of basic service set (Number of BSS) subfield indicates a quantity of the at least one basic service set.

Specifically, the number of basic service set subfield may be used in the first field to indicate the quantity of the at least one basic service set. After receiving the trigger frame, the station determines, by parsing the number of basic service set subfield carried in the first field in the trigger frame, the quantity of basic service sets indicated by the first field, so that the station can obtain the identification information of these basic service sets from the first field based on the quantity of basic service sets indicated by the number of basic service set subfield. In this embodiment of this application, the number of basic service set subfield may be set to indicate the identification information of all the basic service sets indicated by the first field.

It should be noted that the composition structure of the first field is described in detail in FIG. 9 to FIG. 12. In different application scenarios of this application, the first field includes different composition structures, and the various composition structures included in the first field may be combined with each other. For example, the first field may include the association identifier subfield, the number of basic service set subfield, the basic service set identifier subfield, and the number of user info subfield. For another example, the first field may include the association identifier subfield, the basic service set identifier subfield, and the number of user info subfield. For another example, the first field may include the association identifier subfield and the basic service set identifier subfield. For another example, the first field may include the number of basic service set subfield, the basic service set identifier subfield, and the number of user info subfield. A specific composition structure of the first field is not limited, and may be determined with reference to a specific application scenario.

302. The first access point sends the trigger frame to the stations.

In this embodiment of this application, after the first access point generates the trigger frame, the first access point may send the trigger frame to the stations to be triggered, so that the stations can receive the trigger frame.

311. The station STA receives the trigger frame sent by the first access point AP, where the trigger frame is used to trigger the station to send the trigger based physical protocol data unit PPDU, the station belongs to one of the plurality of basic service sets, and the trigger frame includes the identification information of the plurality of basic service sets and the identification information of the station.

In this embodiment of this application, the station may parse the received trigger frame, obtain, from the trigger frame, identification information of a basic service set in which the station is located, and obtain the identification information of the triggered station from the trigger frame.

It should be noted that for descriptions of the first field and the first user info field that are included in the trigger frame received by the station in this embodiment of this application, refer to the foregoing examples in step 301. Details are not described herein again.

312. The station determines to send the trigger based physical protocol data unit PPDU.

In this embodiment of this application, after the station receives the trigger frame, if the station obtains identification information of the station from the trigger frame, in other words, determines that the station is a triggered station, the station may send uplink data, for example, send the TB PPDU.

The following describes a specific application scenario in detail.

For example, the current trigger frame carries a plurality of user info fields, each user info field carries an AID 12 subfield, used to carry an AID of one STA, and another subfield in the user info field is used to carry other scheduling information for the STA. For example, AIDs=2008-2044 and AIDs=2047-4094 are reserved values, and other AID values are already used. In this embodiment of this application, a specific AID value may be used in a user info field to indicate that the user info field is redefined. A specific size of the specific value is not limited in this embodiment. For example, a value of the specific AID may be 2044, 2008, or 2047. In subsequent embodiments of this application, AID=2044 is used as an example for description.

The user info field provided in this embodiment of this application may include 40 bits and a trigger dependent user info field. Trigger dependent user info in a basic trigger frame includes 8 bits. In this embodiment, an uplink coordinated trigger frame is used to perform uplink data scheduling, and may use a basic trigger frame type. Therefore, in this embodiment, a length of 48 bits may be used for a specific user info field. The specific user info field used in this embodiment of this application also extends to another type of trigger frame. For example, a user info field of 40 bits may be used.

Figure 13:
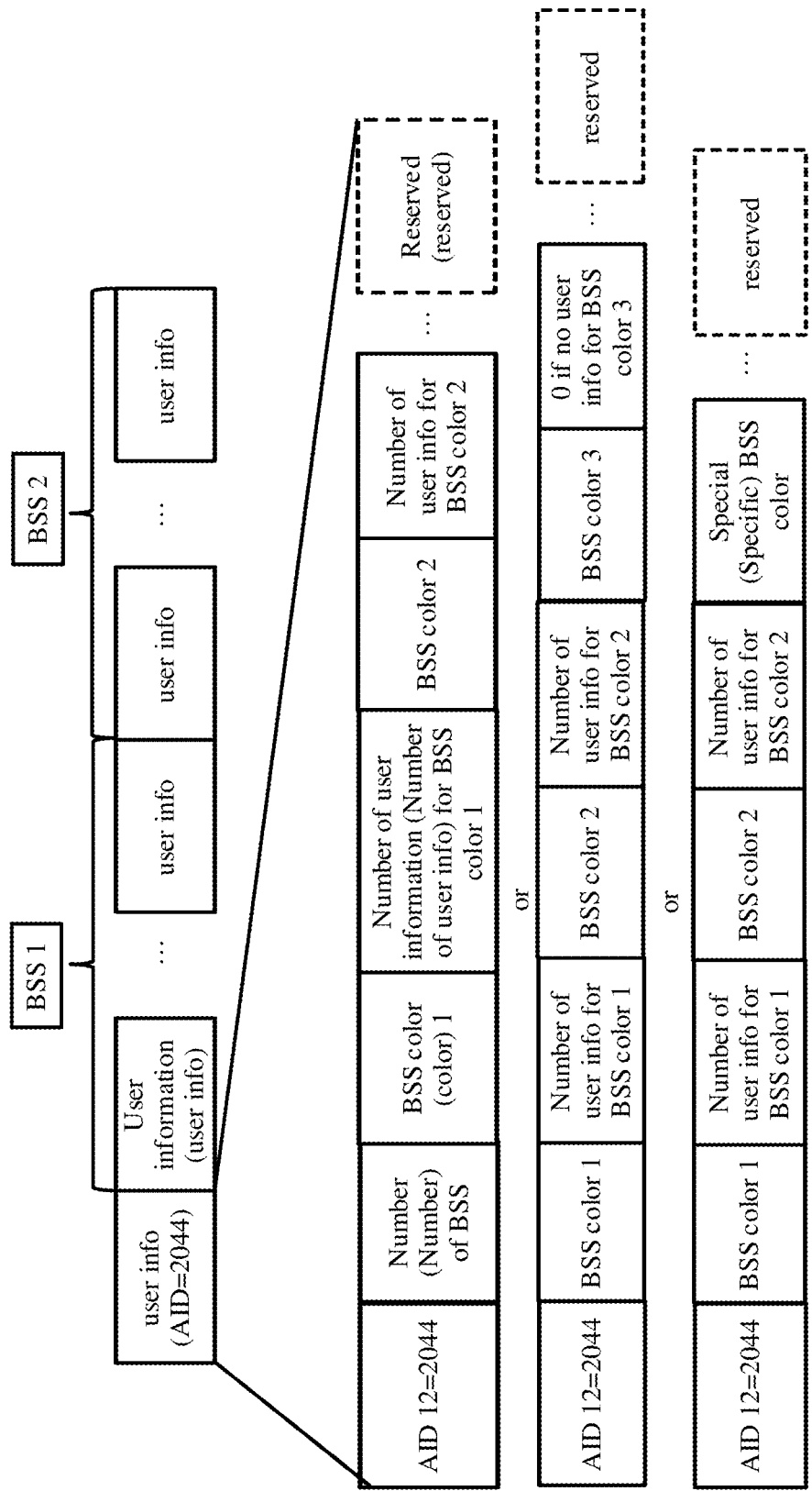
FIG. 13 is a schematic diagram of a frame structure of another trigger frame according to an embodiment of this application.

FIG. 13 is a schematic diagram of a composition structure of a trigger frame according to an embodiment of this application. The first user info field in a user info list is a specific user info field, and the specific user info field is the foregoing first field. The specific user info field includes an AID 12 field. In addition, the specific user info field may further include another field. Details are described below.

In an implementation, the specific user info field includes an association identifier subfield, a number of basic service set subfield, a basic service set identifier subfield, and a number of user info subfield. The specific user info field may further include a reserved subfield. For example, the association identifier subfield is the AID 12 field, and the number of basic service set subfield is a number of BSS subfield shown in FIG. 13. The number of BSS subfield indicates information about a quantity of BSSs carried in the current trigger frame. For example, there are n basic service set identifier subfields: BSS color 1, BSS color 2, . . . , and BSS color n. For example, BSS color n carries a BSS color of the $n^{th}$ BSS. There are n number of user info subfields: number of user info for BSS color 1, number of user info for BSS color 2, . . . , and number of user info for BSS color n. For example, number of user info for BSS color n indicates a quantity of pieces of STA info in the $n^{th}$ BSS. In FIG. 13, an example in which n is equal to 2 is used. A BSS 1 and a BSS 2 are used for uplink coordination, BSS color 1 indicates identification information of the BSS 1, number of user info for BSS color 1 indicates a quantity of user info fields corresponding to a scheduled station in the BSS 1, BSS color 2 indicates identification information of the BSS 2, and number of user info for BSS color 2 indicates a quantity of user info fields corresponding to a scheduled station in the BSS 2.

In another implementation, the specific user info field includes an association identifier subfield, a basic service set identifier subfield, and a number of user info subfield. The specific user info field may further include a reserved subfield. In other words, the specific user info field does not carry a number of BSS field, and directly carries n BSS color subfields and n number of user info for BSS color n subfields, and a value indicated by the last number of user info for BSS color n is all 0. In this case, a subsequent bit does not indicate a BSS color field or a number of user info for BSS color field. For example, a BSS 1 and a BSS 2 are used for uplink coordination, and number of user info for BSS color 3 corresponding to a BSSS 3 indicates all 0. In this case, a subsequent bit does not indicate a BSS color field or a number of user info for BSS color field.

In another implementation, the specific user info field includes an association identifier subfield, a basic service set identifier subfield, and a number of user info subfield. The specific user info field may further include a reserved subfield. In other words, the specific user info field does not carry a number of BSS field, and directly carries n BSS color subfields and n number of user info for BSS color n subfields, and a specific value such as all 0 or all 1 is used in the last BSS color field. In this case, a subsequent bit does not indicate a BSS color field or a number of user info for BSS color field. For example, a BSS 1 and a BSS 2 are used for uplink coordination, BSS color 3 is a specific BSS color, and a value indicated by the specific BSS color is all 0. In this case, a subsequent bit does not indicate a BSS color field or a number of user info for BSS color field.

It may be understood that, in addition to a BSS color, an AP ID, partial BSS IDs, partial AP MAC addresses, or the like may indicate each BSS. The AP ID herein is a unique identifier allocated to each AP through negotiation in a coordination AP set. The partial BSS IDs or the partial AP MAC addresses may be obtained by truncating BSS IDs or MAC addresses, or may be obtained in a specific mapping manner. For ease of description, the BSS color is used as an example for description in subsequent embodiments.

Figure 14:
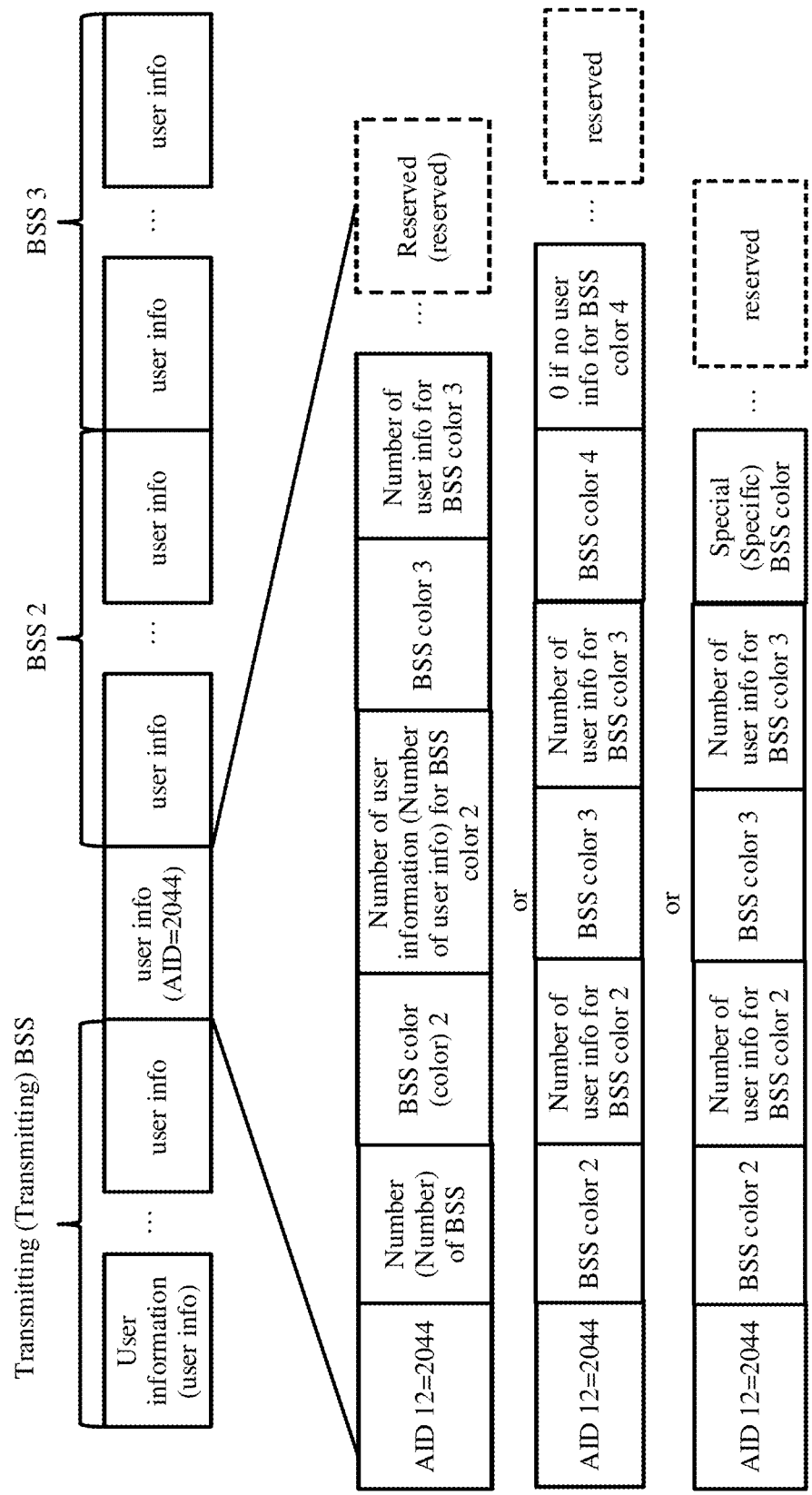
FIG. 14 is a schematic diagram of a frame structure of another trigger frame according to an embodiment of this application.

FIG. 14 shows another implementation of this embodiment. FIG. 14 is similar to FIG. 13 except that a transmitting BSS (or a primary BSS), a BSS 2, and a BSS 3 are used for uplink coordination. The transmitting BSS is not indicated by a specific user info field. The specific user info field indicates the BSS 2 and the BSS 3. A user info field in the transmitting BSS is placed at the most front, and the transmitting BSS is not indicated by a specific user info field. The transmitting BSS (or the primary BSS) may be obtained by using a sending address in a MAC frame header or a BSS color in a SIG field in a physical layer. A user info field carrying a specific AID is placed after the user info field in the transmitting BSS. A frame format of the user info field carrying a specific AID is the same as the format in the method described in FIG. 13, only except that user info related to the transmitting BSS is not carried. Details are not described herein again.

It should be noted that the transmitting BSS is a BSS corresponding to an AP that initiates coordination, a BSS corresponding to an AP that establishes a coordination set, or a BSS that sends a trigger frame.

In addition, it should be noted that, because a length of the user info field is fixed, when one user info field is insufficient to carry identification information of all coordinated BSSs, a plurality of user info fields of specific AIDs may be alternatively carried in one trigger frame. After user info carrying a specific AID 12 and a user info field indicated by the user info, user info of another specific AID 12 is carried. The user info of another specific AID 12 indicates one or more subsequent user info fields.

In the foregoing embodiment, a user info field whose AID 12 is a specific value is introduced to indicate a quantity of BSSs participating in coordination and corresponding user info fields. In the method, allocation to a STA in a BSS in each coordination set may be independent, and no AID space is shared. Therefore, a quantity of STAs that can be supported and flexibility of AID allocation are improved.

Figure 15:
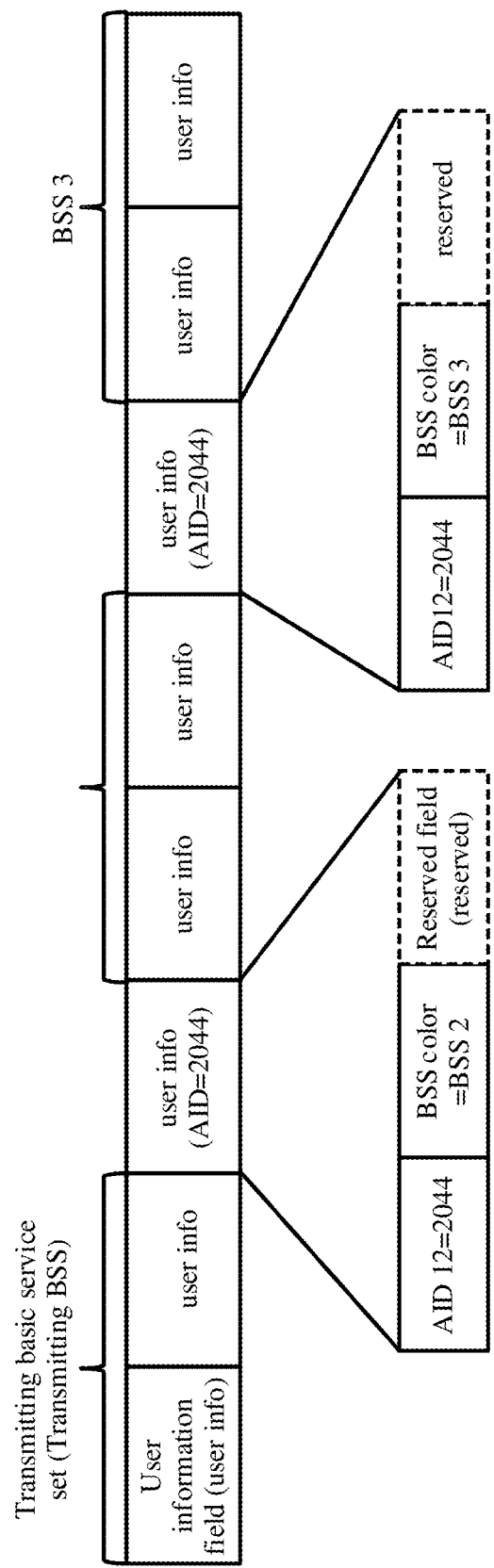
FIG. 15 is a schematic diagram of a frame structure of another trigger frame according to an embodiment of this application.

In other embodiments of this application, FIG. 15 shows another implementation of this embodiment. One user info field whose AID 12 is set to a specific value indicates a user info field in one BSS. A transmitting BSS (or a primary BSS), a BSS 2, and a BSS 3 are used for uplink coordination. The transmitting BSS is not indicated by a specific user info field. One specific user info field indicates the BSS 2, and another specific user info field indicates the BSS 3. User info in the transmitting BSS is placed at the most front. After the user info, a user info field of a specific AID 12 indicates user info in a BSS, and identification information of the BSS is carried in the user info field of a specific AID 12. One trigger frame may carry a plurality of specific user info fields and corresponding user info fields. A user info field between two user info fields carrying specific AIDs 12 belongs to a BSS indicated by the former specific user info field.

In addition, one number of user info field may be further added to each specific user info field, to indicate a quantity of subsequent corresponding user info fields that belong to a BSS corresponding to the special user info field.

The user info field related to the transmitting BSS may alternatively be indicated by a specific user info field. When a specific user info field is used, the user info field related to the transmitting BSS does not need to be placed at the most front in a user info list, and a field configuration manner is more flexible.

In the foregoing embodiment, each user info field whose AID 12 is set to a specific value indicates a user info field related to one BSS. This solution is not limited by a length of the user info field, and can support any quantity of BSSs in participating in coordination.

Figure 16:
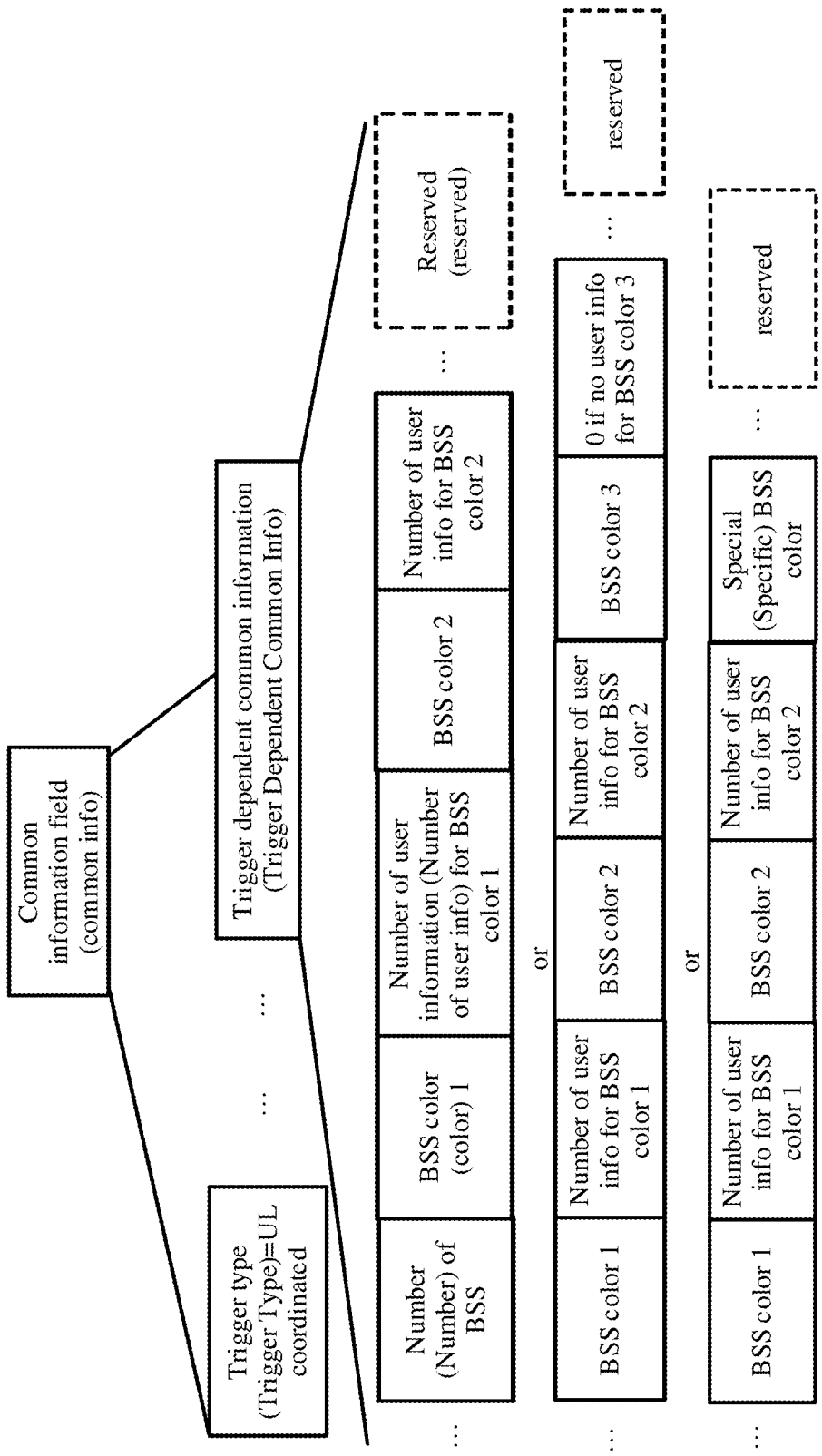
FIG. 16 is a schematic diagram of a frame structure of another trigger frame according to an embodiment of this application.

In some embodiments of this application, as shown in FIG. 16, a trigger frame type such as a UL coordinated trigger frame is introduced for uplink coordination. Because a trigger frame type is introduced, a field in a corresponding frame structure may be redesigned. As described in the foregoing embodiment, a signaling indication that needs to be added may be added to a common info field, for example, carried in a trigger dependent common info field, as shown in FIG. 16. For carried information, a difference from the embodiment shown in FIG. 13 is that a specific AID is not carried.

Figure 17:
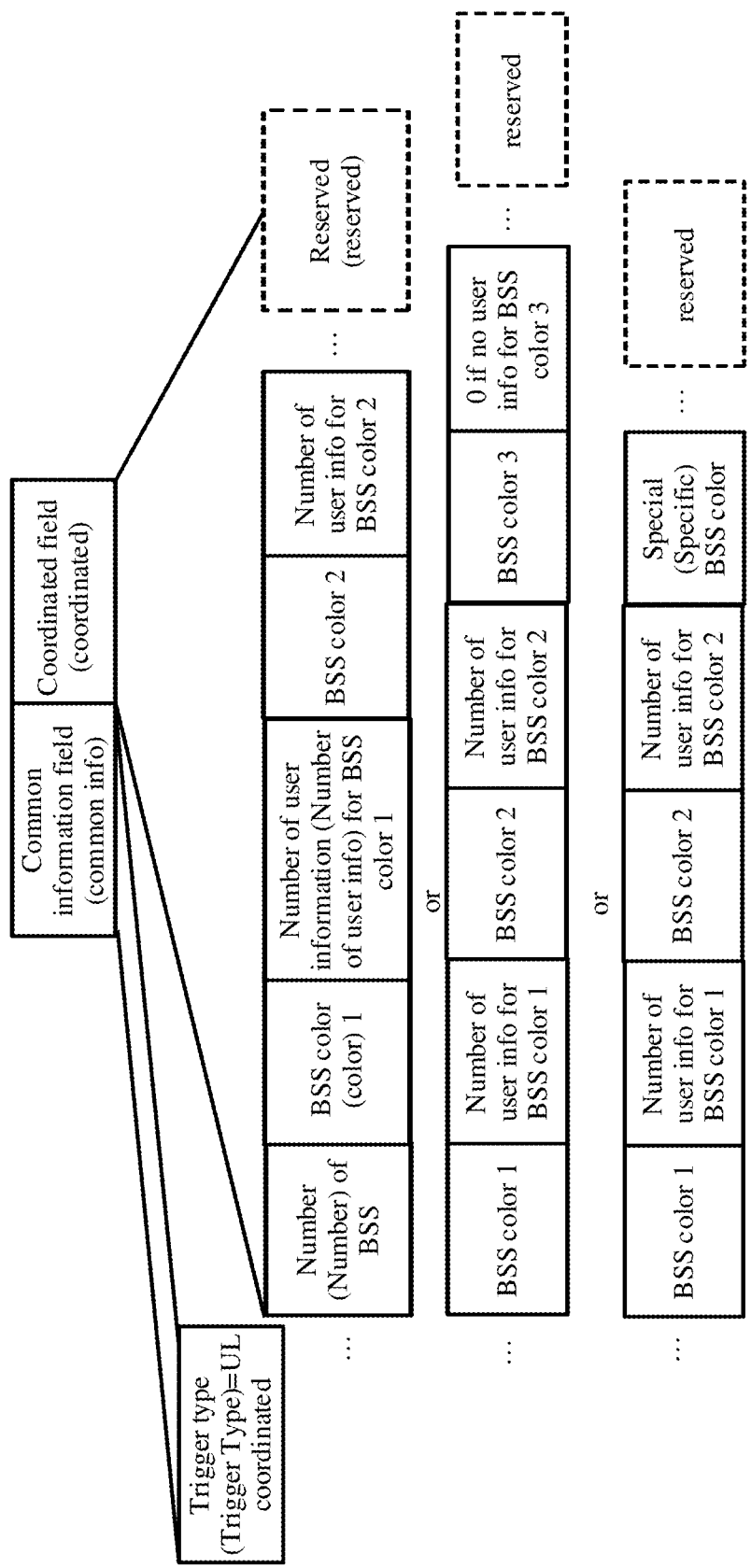
FIG. 17 is a schematic diagram of a frame structure of another trigger frame according to an embodiment of this application.

FIG. 17 shows another implementation. The implementation differs from the implementation of FIG. 16 in that an added field is not carried in a trigger dependent common info field, but a coordinated field is added after a common info field to carry a specific user info field. For carried information, a difference from the embodiment shown in FIG. 13 is that a specific AID is not carried.

In this embodiment of this application, a trigger frame type may be introduced to carry information about user info fields of a plurality of BSSs. In this embodiment of this application, a definition of the user info field is not modified, and a specific AID 12 is not introduced. Uplink scheduling may be performed on stations in a plurality of BSSs in a same trigger frame, and no AID space is shared and AID space in each BSS is not reduced. In addition, AP-end signaling interaction and AID allocation complexity are further reduced.

It can be learned from the example descriptions in the foregoing embodiment that the trigger frame generated by the first access point may include the identification information of the plurality of basic service sets and the identification information of the station. The trigger frame may trigger the plurality of BSSs to perform uplink coordination. The trigger frame generated by the first access point may carry an identifier of a triggered station in one BSS. Therefore, the first access point may independently configure identification information of the station associated with the first access point, without ensuring uniqueness of identifiers of the stations in the plurality of BSSs. This improves flexibility of configuring the identification information of the triggered station by the first access point, and implements communication between the access point and the station in an uplink coordination scenario of a plurality of access points.

Embodiment 2

In a coordination mechanism of a plurality of APs, a frame sent by an AP is received by an AP or a STA in another coordinated BSS. The frame is related to coordination and may be referred to as a coordinated frame. Coordination may involve different procedures in a coordination process, for example, signaling negotiation between coordination APs, channel measurement between an AP and a STA in a coordinated BSS, sending control signaling to the STA in the coordinated BSS by the AP, or sending coordination data to the STA in the coordinated BSS by the AP. A specific type of the frame and content included in the frame are not limited herein. The coordinated frame is sent by an AP and received by a station in a coordinated BSS or jointly received by a current BSS and the station in the coordinated BSS. For example, a first AP and a second AP belong to a same coordination set. The coordination set may include a plurality of BSSs. A BSS in which the first AP is located is the current BSS, and a BSS in which the second AP is located is the coordinated BSS.

A BSS color field such as a universal signal (U-SIG) field of an extremely high throughput (EHT) PPDU is usually included in a SIG field of a PPDU carrying the coordinated frame. Because BSS colors of a plurality of coordinated BSSs are different, and only one BSS color can be placed in a BSS color field, one manner is to set a BSS color of a transmitting BSS. However, a problem of this manner is that all coordination APs notify all STAs participating in coordination of a BSS color corresponding to a transmitting BSS in a current coordination set. When all coordinated BSSs may serve as transmitting BSSs, BSS colors corresponding to all the coordinated BSS are notified. Consequently, all the coordination STAs continue to perform parsing when a BSS color field in a received frame matches the BSS color of the transmitting BSS. Even if an AP in the coordination set sends a non-coordinated frame, a STA in the coordination set continues to parse the frame until the STA determines, based on other information in a MAC frame, that the frame is unrelated to coordination. Therefore, processing resources of the station are wasted.

Figure 18:
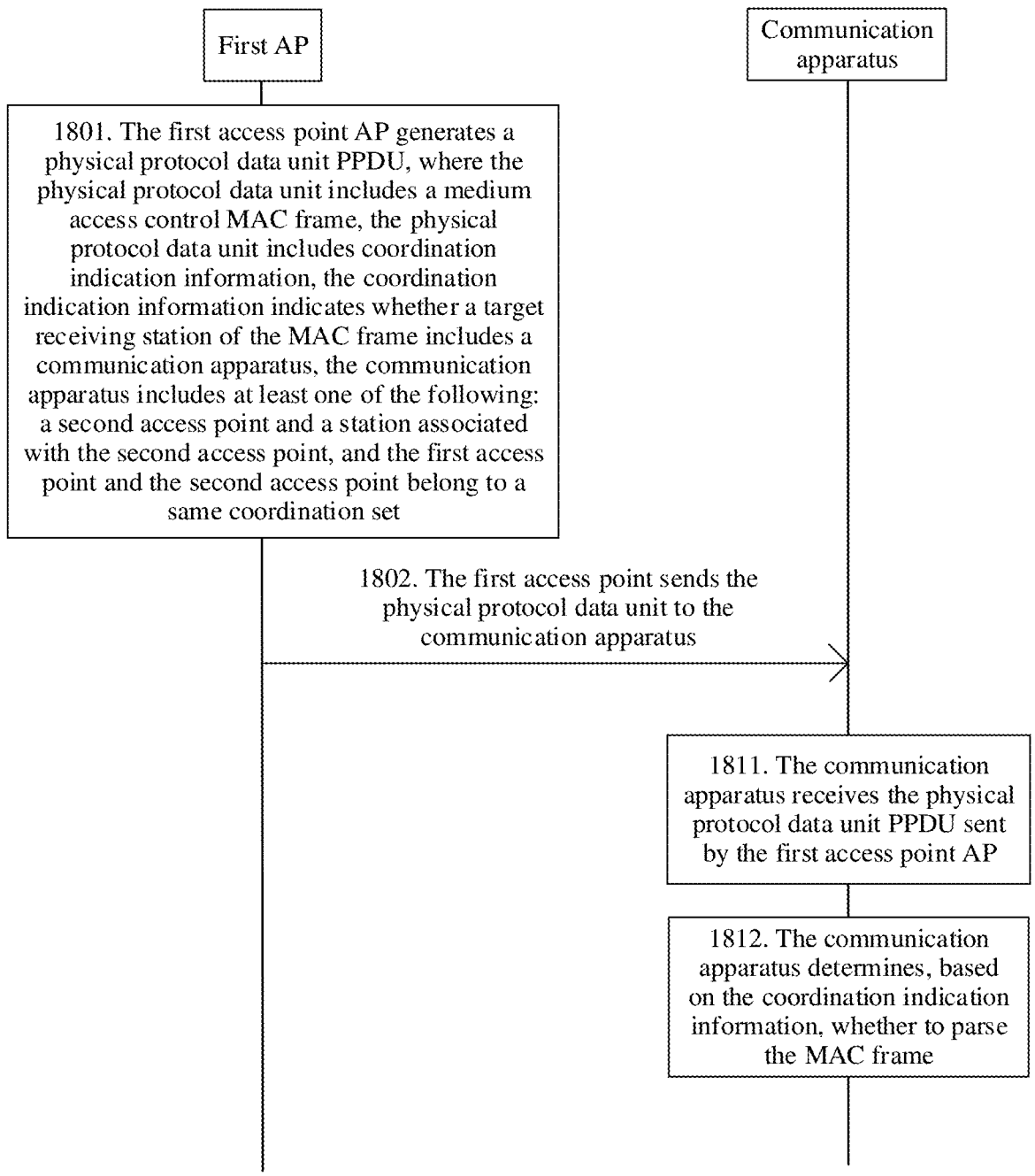
FIG. 18 is a schematic block diagram of a procedure of another uplink coordinated communication method according to an embodiment of this application.

To resolve the foregoing problem, the following describes another uplink coordinated communication method provided in this embodiment of this application. As shown in FIG. 18, the method mainly includes the following process.

1801. A first access point AP generates a physical protocol data unit PPDU, where the physical protocol data unit includes a medium access control MAC frame, the physical protocol data unit includes coordination indication information, the coordination indication information indicates whether a target receiving station of the MAC frame includes a communication apparatus, the communication apparatus includes at least one of the following: a second access point and a station associated with the second access point, and the first access point and the second access point belong to a same coordination set.

The first access point belongs to a first BSS, the second access point belongs to a second BSS, and the first BSS and the second BSS are coordinated BSSs. The first access point and the second access point belong to a same coordination set. The first BSS further includes one or more stations, and the second BSS also includes one or more stations. In this embodiment of this application, the first access point AP sends the PPDU. Therefore, the first BSS is a current BSS (or a transmitting BSS), and the second BSS is a BSS coordinating with the first BSS.

In this embodiment of this application, the first access point and the second access point perform coordinated transmission together, and therefore the first access point and the second access point belong to a same coordination set. The first access point may be a primary access point, and the second access point may be a secondary access point. The physical protocol data unit generated by the first access point carries the coordination indication information, and the coordination indication information indicates whether the target receiving station of the MAC frame carried in the PPDU includes the communication apparatus. The target receiving station of the MAC frame is a station receiving the MAC frame carried in the PPDU. The communication apparatus has a plurality of implementations. For example, the communication apparatus may include at least one of the following: the second access point and the station associated with the second access point.

In some embodiments of this application, the physical protocol data unit includes the coordination indication information, and the coordination indication information indicates whether a target receiving station of the PPDU includes a communication apparatus. The target receiving station of the PPDU is a station receiving the PPDU. The communication apparatus includes at least one of the following: the second access point and the station associated with the second access point.

In some embodiments of this application, the physical protocol data unit includes the coordination indication information, the coordination indication information indicates whether the communication apparatus continues to parse a payload of the PPDU, and the communication apparatus includes at least one of the following: the second access point and the station associated with the second access point. For example, the coordination indication information occupies 1 bit, and may carry a first value or a second value. If the coordination indication information carries the first value, the coordination indication information indicates that the communication apparatus continues to parse the payload of the PPDU; or if the coordination indication information carries the second value, the coordination indication information indicates that the communication apparatus may not continue to parse the payload of the PPDU.

Further, the coordination indication information may indicate whether a station associated with the first access point continues to parse the payload of the PPDU. For example, the coordination indication information occupies 2 bits, and may carry a first value, a second value, or a third value. If the coordination indication information carries the first value, the coordination indication information indicates that the communication apparatus continues to parse the payload of the PPDU and the station associated with the first access point does not continue to parse the payload of the PPDU; or if the coordination indication information carries the second value, the coordination indication information indicates that the communication apparatus may not continue to parse the payload of the PPDU and the station associated with the first access point continues to parse the payload of the PPDU; or if the coordination indication information carries the third value, the coordination indication information indicates that the communication apparatus continues to parse the payload of the PPDU and the station associated with the first access point continues to parse the payload of the PPDU.

1802. The first access point sends the physical protocol data unit to the communication apparatus.

In this embodiment of this application, after the first access point generates the physical protocol data unit, the first access point sends the physical protocol data unit to the communication apparatus, so that the communication apparatus that receives the PPDU can obtain the coordination indication information from the PPDU, and the communication apparatus determines, by parsing the coordination indication information, whether to continue to parse the MAC frame.

In some embodiments of this application, the physical protocol data unit includes a signaling (SIG) field. The coordination indication information is carried in the signaling field.

Specifically, in the foregoing embodiment of this application, the coordination indication information is added to the SIG field, so that the coordination station can determine, through distinguishing as early as possible, whether the MAC frame is related to coordination, and can reduce power or perform spatial multiplexing as early as possible.

In some embodiments of this application, if the coordination indication information carries a first value, the coordination indication information indicates that the target receiving station of the MAC frame includes the communication apparatus; or if the coordination indication information carries a second value, the coordination indication information indicates that the target receiving station of the MAC frame does not include the communication apparatus.

For example, the coordination indication information may occupy 1 bit. For example, when the first value is 0, the coordination indication information indicates that the target receiving station of the MAC frame includes the communication apparatus; and when the second value is 1, the coordination indication information indicates that the target receiving station of the MAC frame does not include the communication apparatus; or when the first value is 1, the coordination indication information indicates that the target receiving station of the MAC frame includes the communication apparatus; and when the second value is 0, the coordination indication information indicates that the target receiving station of the MAC frame does not include the communication apparatus. Specifically, a specific value carried in the coordination indication information may be determined based on an application scenario.

1811. The communication apparatus receives the physical protocol data unit PPDU sent by the first access point AP, where the physical protocol data unit includes the medium access control MAC frame, the physical protocol data unit includes the coordination indication information, the coordination indication information indicates whether the target receiving station of the MAC frame includes the communication apparatus, the communication apparatus includes at least one of the following: the second access point and the station associated with the second access point, and the first access point and the second access point belong to a same coordination set.

1812. The communication apparatus determines, based on the coordination indication information, whether to parse the MAC frame.

In this embodiment, the MAC frame carried in the PPDU has a plurality of implementations. For example, the MAC frame may be a coordinated frame. For example, coordination indication information is added to a SIG field of a PPDU carrying the coordinated frame, to indicate whether the frame is related to coordination. A station in a coordination set continues to perform parsing only when coordination indicates that the frame is related to coordination. When an AP in a coordination set sends a frame that is unrelated to coordination and that is specific only to a station in a current BSS, coordination in SIG of a PPDU carrying the frame indicates that the frame is unrelated to coordination, and a station in the coordination set does not continue to perform parsing based on an indication of coordination. The coordination indication information may be carried in an independent subfield in SIG, or may be indicated by reusing another subfield. When the method is applied to the EHT standard, the SIG field is usually referred to as an EHT-U-SIG, EHT-SIG, or EHT-SIG-A field. The coordinated field may be 1 bit. When the coordinated field is set to 0, it indicates that content carried in the PPDU is unrelated to coordination, and when the coordinated field is set to 1, it indicates that content carried in the PPDU is related to coordination; or vice versa.

Specifically, the coordinated frame may be a UL coordinated trigger frame. When coordination indication information in SIG of a PPDU carrying the UL coordinated trigger frame indicates that the frame is related to coordination, it means that the UL coordinated trigger frame is used to trigger stations in a plurality of other coordinated BSSs to perform uplink transmission. A STA in a coordinated BSS parses content of the MAC frame. Otherwise, the coordination indication information indicates that the frame is unrelated to coordination, and the PPDU does not carry the UL coordinated trigger frame. A STA in a coordinated BSS does not parse content of the MAC frame.

In another example, the first AP sends a PPDU, and a SIG field of the PPDU includes coordination indication information. If the PPDU is used for coordinated transmission, in other words, a target receiving station of the PPDU includes a STA 2 associated with the second AP, the first AP may set the indication information to a first value to indicate that the PPDU is related to coordination, the target receiving station of the PPDU includes the STA 2, and data of the STA 2 is carried. After receiving the PPDU, the STA 2 determines that the PPDU is related to coordination, and the STA 2 parses the PPDU to obtain data in the PPDU. If the PPDU is not used for coordinated transmission, in other words, a target receiving station of the PPDU does not include a STA 2 associated with the second AP, and data of the STA 2 is not carried, the first AP may set the indication information to a second value to indicate that the PPDU is unrelated to coordination. The target receiving station of the PPDU does not include the STA 2. After receiving the PPDU, the STA 2 determines that the PPDU is unrelated to coordination, and the STA 2 does not parse the PPDU.

It can be learned from the example descriptions of Embodiment 2 that the coordination indication information is added to the PPDU, so that a coordination station can determine, through distinguishing as early as possible, whether the MAC frame carried in the PPDU is related to coordination. In this way, the station can reduce power or perform spatial multiplexing as early as possible.

Embodiment 3

Currently, when a single access point sends a trigger frame to a station, the station can calculate, based on a power parameter carried in the trigger frame, transmit power of performing uplink transmission by the station. Currently, there is no solution applicable to transmit power of uplink transmission in an uplink coordination scenario of a plurality of access points. If the transmit power calculation solution used in a non-coordination scenario of a single access point is still used, calculated transmit power of uplink transmission is inaccurate. Because the plurality of access points each send a trigger frame in the uplink coordination scenario of the plurality of access points, interference is generated on channels between a station and the plurality of access points.

To resolve the foregoing technical problem, in the uplink coordination scenario of the plurality of access points, this embodiment of this application further provides a solution for transmit power of sending a trigger based physical protocol data unit.

Figure 19:
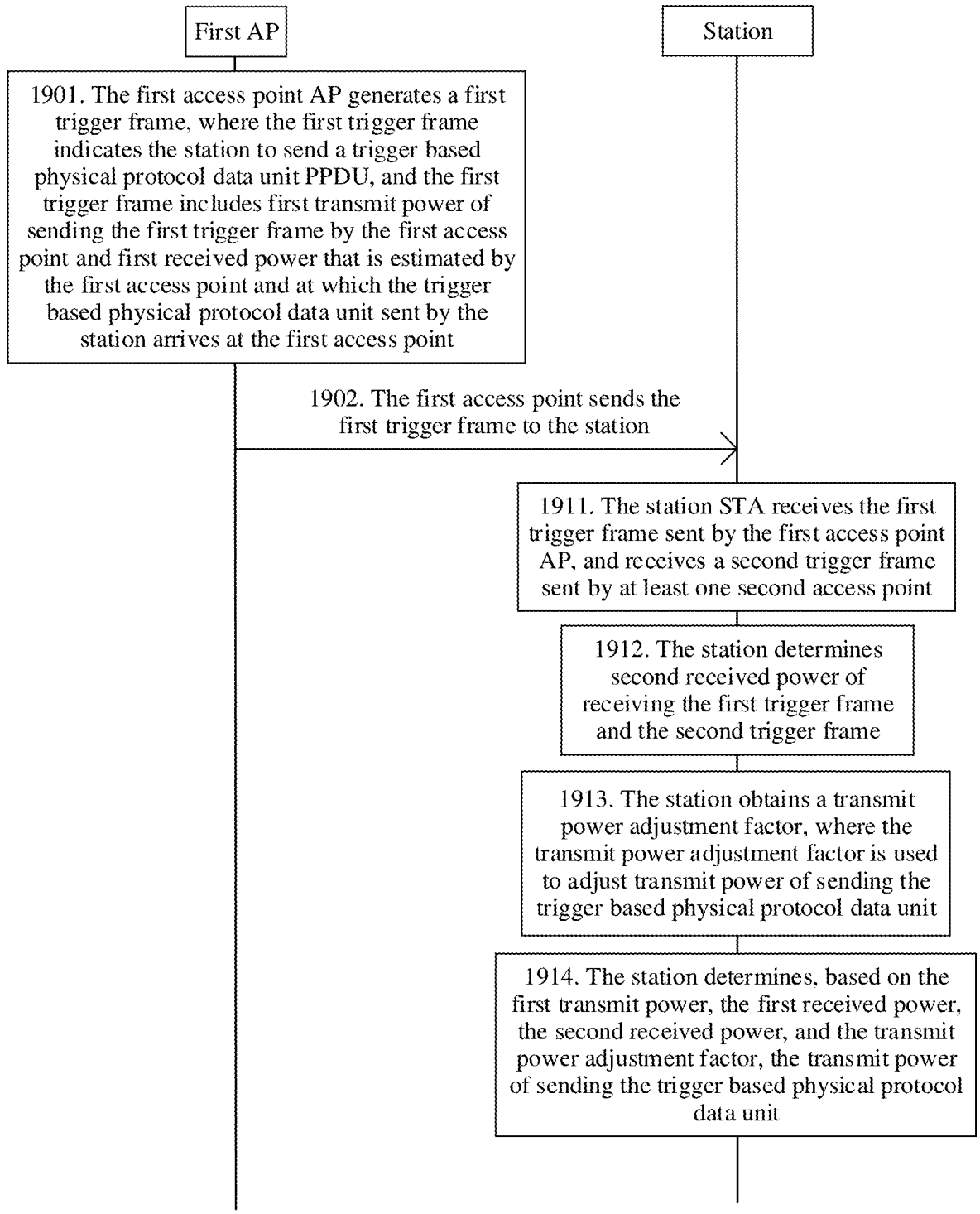
FIG. 19 is a schematic block diagram of a procedure of another uplink coordinated communication method according to an embodiment of this application.

The following describes another uplink coordinated communication method provided in this embodiment of this application. As shown in FIG. 19, the method mainly includes the following process.

1901. A first access point AP generates a first trigger frame.

The first trigger frame indicates a station to send a trigger based physical protocol data unit PPDU, and the first trigger frame includes first transmit power of sending the first trigger frame by the first access point and first received power that is estimated by the first access point and at which the trigger based physical protocol data unit sent by the station arrives at the first access point.

The station is associated with the first access point, the first access point may generate the first trigger frame, the first trigger frame indicates the station to send the trigger based physical protocol data unit PPDU, and the first trigger frame includes the first transmit power and the first received power. The first transmit power is the transmit power of sending the first trigger frame by the first access point. For example, a unit of the transmit power is milliwatt mW or watt W, and the first transmit power may be represented as P0. For another example, a unit of the transmit power is a decibel relative to one milliwatt dBm, and the first transmit power may be represented as $Tx_{pwr}^{AP}$.

The first received power is the received power that is estimated by the first access point and at which the trigger based physical protocol data unit sent by the station arrives at the first access point. For example, a unit of the received power is milliwatt mW or watt W, and the first received power may be represented as Ptar. For another example, a unit of the received power is a decibel relative to one milliwatt dBm, and the first received power may be represented as $Target_{RSSI}$.

In this embodiment of this application, the first access point and at least one second access point may belong to a same coordination set, the second access point may generate a second trigger frame, the second trigger frame indicates the station to send the trigger based physical protocol data unit PPDU, and the second trigger frame includes transmit power of sending the second trigger frame by the second access point and received power that is estimated by the second access point and at which the trigger based physical protocol data unit sent by the station arrives at the second access point.

1902. The first access point sends the first trigger frame to the station.

In this embodiment of this application, the first access point may send the first trigger frame to the station.

The at least one second access point and the first access point belong to a same coordination set, and the second access point may also send the second trigger frame to the station, which is not limited.

In some embodiments of this application, the uplink coordinated communication method performed by the first access point AP may further include the following step:

The first access point sends a first medium access control MAC frame to the station, where the first medium access control frame includes second transmit power of sending the first medium access control frame by the first access point.

The first MAC frame may be a frame carrying transmit power. For example, the frame carrying transmit power may be a beacon frame, a channel measurement frame, or a coordinated frame. An implementation of the first MAC frame is not limited herein. The first access point sends the first medium access control MAC frame to the station, so that the station receives the first MAC frame, and the station can determine a transmit power adjustment factor based on the first MAC frame. For descriptions of the transmit power adjustment factor, refer to descriptions in subsequent embodiments.

In this embodiment of this application, the first access point and the at least one second access point may belong to a same coordination set, and the second access point may send a second MAC frame to the station. The second MAC frame includes third transmit power of sending the second MAC frame by the second access point.

In some embodiments of this application, the uplink coordinated communication method performed by the first access point AP may further include the following step:

The first access point sends a transmit power adjustment factor to the station, where the transmit power adjustment factor is used by the station to determine transmit power of sending the trigger based physical protocol data unit.

The first access point may determine the transmit power adjustment factor, and then the first access point sends the transmit power adjustment factor to the station. After the station receives the transmit power adjustment factor, the station may determine the transmit power of sending the trigger based physical protocol data unit. For details, refer to descriptions in subsequent embodiments.

In this embodiment of this application, the first access point and the at least one second access point may belong to a same coordination set. The second access point may send a transmit power adjustment factor to the station. After the station receives the transmit power adjustment factor, the station may determine transmit power of sending the trigger based physical protocol data unit. For details, refer to descriptions in subsequent embodiments.

1911. The station STA receives the first trigger frame sent by the first access point AP, and receives the second trigger frame sent by the at least one second access point, where the station and the first access point belong to a same basic service set BSS, and the station and the at least one second access point belong to different basic service sets.

The first trigger frame and/or the second trigger frame indicate or indicates the station to send the trigger based physical protocol data unit PPDU, and the first trigger frame includes the first transmit power of sending the first trigger frame by the first access point and the first received power that is estimated by the first access point and at which the trigger based physical protocol data unit sent by the station arrives at the first access point.

In this embodiment of this application, the station and the first access point are in a same basic service set, and the first access point and the at least one second access point belong to a same coordination set. In addition to receiving the first trigger frame, the station may receive the second trigger frame sent by the at least one second access point.

1912. The station determines second received power of receiving the first trigger frame and the second trigger frame.

The first access point sends the first trigger frame to the station, and the at least one second access point sends the second trigger frame to the station. Therefore, the station receives a plurality of trigger frames (for example, including the first trigger frame and the second trigger frame) at the same time. Received power of receiving the plurality of trigger frames that is measured by the station is the second received power.

1913. The station obtains the transmit power adjustment factor, where the transmit power adjustment factor is used to adjust the transmit power of sending the trigger based physical protocol data unit.

In this embodiment of this application, because the station may receive a plurality of trigger frames at the same time, the station needs to consider impact, on the transmit power of sending the trigger based physical protocol data unit by the station, caused by a plurality of access points. In this embodiment of this application, the station obtains the transmit power adjustment factor. The station may adjust, by using the transmit power adjustment factor, the transmit power of sending the trigger based physical protocol data unit. The transmit power of sending the trigger based physical protocol data unit is adjusted by using a plurality of implementations. For details, refer to example descriptions in subsequent embodiments.

In some embodiments of this application, the transmit power adjustment factor is a pre-specified value; or
the transmit power adjustment factor is obtained by the station from the first access point.

Pre-specification may be pre-specification of a communication protocol, and the station may obtain the transmit power adjustment factor based on a preconfigured communication protocol. For another example, the first access point may determine the transmit power adjustment factor, and then the first access point sends the transmit power adjustment factor to the station. After the station receives the transmit power adjustment factor, the station may determine the transmit power of sending the trigger based physical protocol data unit. For another example, the second access point may send the transmit power adjustment factor to the station. After the station receives the transmit power adjustment factor, the station may determine the transmit power of sending the trigger based physical protocol data unit.

In some embodiments of this application, that the station obtains the transmit power adjustment factor includes:

The station receives the first medium access control MAC frame sent by the first access point, where the first medium access control frame includes the second transmit power of sending the first medium access control frame by the first access point;

the station determines third received power of receiving the first medium access control frame; and the station obtains the transmit power adjustment factor based on the second transmit power, the third received power, and the second received power.

The first MAC frame may be a frame carrying transmit power. For example, the frame carrying transmit power may be a beacon frame, a channel measurement frame, or a coordinated frame. An implementation of the first MAC frame is not limited herein. The first access point sends the first MAC frame to the station, so that the station receives the first MAC frame. The station obtains the second transmit power of sending the first medium access control frame by the first access point, and the station may further measure the third received power of receiving the first MAC frame. In this case, the station may determine first channel attenuation information between the station and the first access point by using the second transmit power and the third received power. The first channel attenuation information may also be referred to as first path loss information. Finally, the station may obtain the transmit power adjustment factor based on the second transmit power, the third received power, and the second received power. For example, the station determines the first channel attenuation information based on the second transmit power and the third received power, obtains second channel attenuation information between the station and the second access point based on the first channel attenuation information and the second received power, and then determines the transmit power adjustment factor based on the first channel attenuation information and the second channel attenuation information. The transmit power adjustment factor may be a ratio of the first channel attenuation information to the second channel attenuation information. The station may obtain the transmit power adjustment factor based on the second transmit power, the third received power, and the second received power by using another implementation. For example, the station determines a change proportion of received power based on the second transmit power, the third received power, and the second received power, and then sets a corresponding transmit power adjustment factor based on the change proportion. A specific implementation of the transmit power adjustment factor is not limited.

In some embodiments of this application, that the station obtains the transmit power adjustment factor includes:

The station receives the first medium access control frame sent by the first access point, and receives the second medium access control frame sent by the second access point, where the first medium access control frame includes the second transmit power of the first medium access control frame by the first access point, and the second medium access control frame includes the third transmit power of sending the second medium access control frame by the second access point;

the station determines third received power of receiving the first medium access control frame, and determines fourth received power of receiving the second medium access control frame; and the station obtains the transmit power adjustment factor based on the second transmit power, the third transmit power, the third received power, and the fourth received power.

The first MAC frame may be a frame carrying transmit power. For example, the frame carrying transmit power may be a beacon frame, a channel measurement frame, or a coordinated frame. An implementation of the first MAC frame is not limited herein. The first access point sends the first MAC frame to the station, so that the station receives the first MAC frame. The station obtains the second transmit power of sending the first medium access control frame by the first access point, and the station may further measure the third received power of receiving the first MAC frame. In this case, the station may determine first channel attenuation information between the station and the first access point by using the second transmit power and the third received power. The first channel attenuation information may also be referred to as first path loss information. Similarly, the second access point may also send the second MAC frame. Similarly, the station may also determine second channel attenuation information between the station and the second access point. The second channel attenuation information may also be referred to as second path loss information. It should be noted that the first MAC frame and the second MAC frame may be sent at different time points. The station obtains the transmit power adjustment factor based on the second transmit power, the third transmit power, the third received power, and the fourth received power. For example, the station determines the first channel attenuation information based on the second transmit power and the third received power, obtains the second channel attenuation information between the station and the second access point based on the third transmit power and the fourth received power, and then determines the transmit power adjustment factor based on the first channel attenuation information and the second channel attenuation information. The transmit power adjustment factor may be a ratio of the first channel attenuation information to the second channel attenuation information. The station may obtain the transmit power adjustment factor based on the second transmit power, the third transmit power, the third received power, and the fourth received power by using another implementation. For example, the station determines a change proportion of transmit power based on the second transmit power and the third transmit power, determines a change proportion of received power based on the third received power and the fourth received power, and then sets a corresponding transmit power adjustment factor based on the change proportions. A specific implementation of the transmit power adjustment factor is not limited.

In some embodiments of this application, that the station obtains the transmit power adjustment factor includes:

The station receives the second medium access control frame sent by the second access point, where the second medium access control frame includes the third transmit power of sending the second medium access control frame by the second access point;

the station determines fourth received power of receiving the second medium access control frame; and the station obtains the transmit power adjustment factor based on the third transmit power, the fourth received power, and the second received power.

The second MAC frame may be a frame carrying transmit power. For example, the frame carrying transmit power may be a beacon frame, a channel measurement frame, or a coordinated frame. An implementation of the second MAC frame is not limited herein. The second access point sends the second MAC frame to the station, so that the station receives the second MAC frame. The station obtains the second transmit power of sending the second medium access control frame by the second access point, and the station may further measure the fourth received power of receiving the second MAC frame. In this case, the station may determine second channel attenuation information between the station and the second access point by using the third transmit power and the fourth received power. The second channel attenuation information may also be referred to as second path loss information. Finally, the station may obtain the transmit power adjustment factor based on the third transmit power, the fourth received power, and the second received power. For example, the station determines the second channel attenuation information based on the third transmit power and the fourth received power, obtains first channel attenuation information between the station and the first access point based on the second channel attenuation information and the second received power, and then determines the transmit power adjustment factor based on the first channel attenuation information and the second channel attenuation information. The transmit power adjustment factor may be a ratio of the first channel attenuation information to the second channel attenuation information. The station may obtain the transmit power adjustment factor based on the third transmit power, the fourth received power, and the second received power by using another implementation. For example, the station determines a change proportion of received power based on the third transmit power, the fourth received power, and the second received power, and then sets a corresponding transmit power adjustment factor based on the change proportion. A specific implementation of the transmit power adjustment factor is not limited.

It should be noted that there are a plurality of sequences of performing step 1913 and step 1912. For example, step 1912 may be performed before step 1913, or step 1913 may be performed before step 1912, or step 1912 and step 1913 may be performed at the same time. This is not limited herein.

1914. The station determines, based on the first transmit power, the first received power, the second received power, and the transmit power adjustment factor, the transmit power of sending the trigger based physical protocol data unit.

In this embodiment of this application, after the station obtains the transmit power adjustment factor, the station may determine, by using the first transmit power, the first received power, the second received power, and the transmit power adjustment factor together, the transmit power of sending the trigger based physical protocol data unit. In this embodiment of this application, because the station may receive trigger frames sent by a plurality of access points, the station obtains the transmit power adjustment factor, and adjust, by using the transmit power adjustment factor, the transmit power of sending the trigger based physical protocol data unit, so that adjusted transmit power of sending the trigger based physical protocol data unit can enable received power at which the trigger based physical protocol data unit arrives at the first access point to be the first received power, thereby improving accuracy of calculating the transmit power of the trigger based physical protocol data unit in an uplink coordination scenario of a plurality of APs. The transmit power of sending the trigger based physical protocol data unit is calculated in a plurality of manners. The following provides detailed example descriptions.

In some embodiments of this application, that the station determines, based on the first transmit power, the first received power, the second received power, and the transmit power adjustment factor, the transmit power of sending the trigger based physical protocol data unit includes:

The station determines, in the following manner, the transmit power of sending the trigger based physical protocol data unit:

$$Pt = Ptar \times P0 \times k / Pr.$$

Pt represents the transmit power of sending the trigger based physical protocol data unit, Ptar represents the first received power, P0 represents the first transmit power, Pr represents the second received power, k represents the transmit power adjustment factor, × is a multiplication symbol, / is a division symbol, and + is an addition symbol.

The station may calculate, by using the foregoing formula, the transmit power of sending the trigger based physical protocol data unit, and the station may adjust, by using the transmit power adjustment factor, the transmit power of sending the trigger based physical protocol data unit, so that adjusted transmit power of sending the trigger based physical protocol data unit can enable received power at which the trigger based physical protocol data unit arrives at the first access point to be the first received power, thereby improving accuracy of calculating the transmit power of the trigger based physical protocol data unit in the uplink coordination scenario of a plurality of APs.

In some embodiments of this application, that the station determines, based on the first transmit power, the first received power, the second received power, and the transmit power adjustment factor, the transmit power of sending the trigger based physical protocol data unit includes:

If the first transmit power is the same as the transmit power of sending the second trigger frame by the second access point, the station determines, in the following manner, the transmit power of sending the trigger based physical protocol data unit:

$$Pt = Ptar \times P0 \times (1+a) / Pr.$$

Pt represents the transmit power of sending the trigger based physical protocol data unit, Ptar represents the first received power, P0 represents the first transmit power, Pr represents the second received power, a represents the transmit power adjustment factor, × is a multiplication symbol, / is a division symbol, and + is an addition symbol.

The station may calculate, by using the foregoing formula, the transmit power of sending the trigger based physical protocol data unit, and the station may adjust, by using the transmit power adjustment factor, the transmit power of sending the trigger based physical protocol data unit, so that adjusted transmit power of sending the trigger based physical protocol data unit can enable received power at which the trigger based physical protocol data unit arrives at the first access point to be the first received power, thereby improving accuracy of calculating the transmit power of the trigger based physical protocol data unit in the uplink coordination scenario of a plurality of APs.

In some embodiments of this application, that the station determines, based on the first transmit power, the first received power, the second received power, and the transmit power adjustment factor, the transmit power of sending the trigger based physical protocol data unit includes:

If the first transmit power is different from the transmit power of sending the second trigger frame by the second access point, the station determines, in the following manner, the transmit power of sending the trigger based physical protocol data unit:

$$Pt = Ptar \times P0 \times (1 + a \times b) / Pr.$$

Pt represents the transmit power of sending the trigger based physical protocol data unit, Ptar represents the first received power, P0 represents the first transmit power, Pr represents the second received power, a represents the transmit power adjustment factor, b represents a ratio of the first transmit power to the transmit power of sending the second trigger frame by the second access point, × is a multiplication symbol, / is a division symbol, and + is an addition symbol.

When the first transmit power is different from the transmit power of sending the second trigger frame by the second access point, the station further obtains the ratio of the first transmit power to the transmit power of sending the second trigger frame by the second access point, that is, the station obtains the parameter b. Specifically, the parameter b may be notified by the first access point to the station, or may be calculated by the station based on the first transmit power and the transmit power of sending the second trigger frame by the second access point. This is not limited herein. The station may calculate, by using the foregoing formula, the transmit power of sending the trigger based physical protocol data unit, and the station may adjust, by using the transmit power adjustment factor, the transmit power of sending the trigger based physical protocol data unit, so that adjusted transmit power of sending the trigger based physical protocol data unit can enable received power at which the trigger based physical protocol data unit arrives at the first access point to be the first received power, thereby improving accuracy of calculating the transmit power of the trigger based physical protocol data unit in the uplink coordination scenario of a plurality of APs.

In some embodiments of this application, that the station determines, based on the first transmit power, the first received power, the second received power, and the transmit power adjustment factor, the transmit power of sending the trigger based physical protocol data unit includes:

The station determines, in the following manner, the transmit power of sending the trigger based physical protocol data unit:

$$Tx_{pwr}^{STA} = Tx_{pwr}^{AP} - DL_{RSSI} + Target_{RSSI} + m.$$

$Tx_{pwr}^{STA}$ represents the transmit power of sending the trigger based physical protocol data unit, $Target_{RSSI}$ represents the first received power, $Tx_{pwr}^{AP}$ represents the first transmit power, $DL_{RSSI}$ represents the second received power, m represents the transmit power adjustment factor, + is an addition symbol, and − is a subtraction symbol.

The station may calculate, by using the foregoing formula, the transmit power of sending the trigger based physical protocol data unit, and the station may adjust, by using the transmit power adjustment factor, the transmit power of sending the trigger based physical protocol data unit, so that adjusted transmit power of sending the trigger based physical protocol data unit can enable received power at which the trigger based physical protocol data unit arrives at the first access point to be the first received power, thereby improving accuracy of calculating the transmit power of the trigger based physical protocol data unit in the uplink coordination scenario of a plurality of APs.

Figure 20:
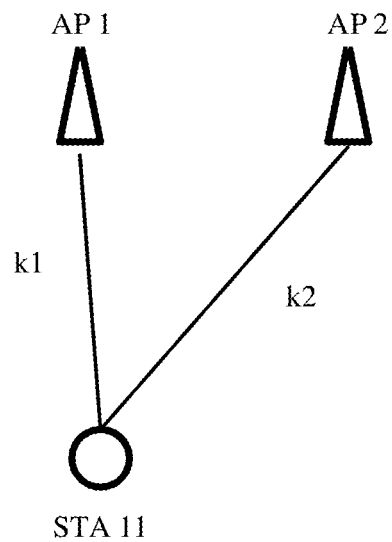
FIG. 20 is a schematic diagram of a composition architecture of a coordination set according to an embodiment of this application.

The following describes, by using a detailed scenario, a process of calculating the transmit power of sending the trigger based physical protocol data unit. FIG. 20 is a schematic diagram of a composition architecture of a coordination set according to an embodiment of this application. The following describes an example in which one STA 11 is associated with an AP 1 and the AP 1 and an AP 2 belong to a same coordination set.

In FIG. 20, when the AP 1 and the AP 2 simultaneously send trigger frames including same content, a signal received by the STA 11 is a signal obtained through superimposition of signals sent by the AP 1 and the AP 2. The station STA 11 cannot distinguish a part that comes from the AP 1, and therefore cannot calculate transmit power of a TB PPDU. This embodiment provides a method for calculating the transmit power of the TB PPDU by the STA 11, so that received power, at the AP 1, of a signal sent by the STA 11 is equal to received power that is estimated by the AP 1 and at which the TB PPDU sent by the STA 11 arrives at the AP 1.

Specifically, parameters involved in this embodiment of this application are first described as follows:

P0 is transmit power used when the AP 1 sends the trigger frame;
Ptar is estimated received power at which the TB PPDU sent by the STA 11 arrives at the AP 1;
Pr is a received power of the trigger frame at the STA 11;
Pt is the transmit power used when the STA 11 sends the TB PPDU;
k1 is a signal attenuation coefficient or a path loss coefficient between the AP 1 and the STA 11, where for example, uplink and downlink channels are peer channels, in other words, have a same attenuation coefficient; and
k2 is a signal attenuation coefficient or a path loss coefficient between the AP 2 and the STA 11, where for example, uplink and downlink channels are peer channels, in other words, have a same attenuation coefficient, where $a = k2/k1.$ In this embodiment, a unit of the transmit power is milliwatt mW or watt W. First, it is assumed that the AP 2 and the AP 1 use same transmit power. The two APs jointly send the trigger frames including same content, and the trigger frame includes only one AP transmit power setting parameter. A method for calculating Pt when the AP 1 and the AP 2 have different transmit power is described in subsequent embodiments.

Because the STA 11 receives the signal obtained through superimposition of the signals of the AP 1 and the AP 2, $Pr = (k1+k2) \times P0$, that is, $$Pr = k1 \times (1+a) \times P0 \quad (0)$$

The following may be obtained by transforming the formula:

$$k1 = Pr/(1+a)/P0 \quad (1)$$

When the STA 11 sends the TB PPDU, the estimated received power at an AP 1 end is Ptar. The following may be obtained based on the attenuation coefficient k1:

$$Pt = Ptar/k1 \quad (2)$$

The following may be obtained by substituting Formula (1) into Formula (2):

$$Pt = Ptar \times P0 \times (1+a)/Pr \quad (3)$$

In Formula (3), the parameter a, namely, a ratio of the attenuation coefficient k2 to the attenuation coefficient k1, is used, and a may be obtained in a plurality of manners. For example, the AP may include transmit power in a to-be-sent beacon frame, and the STA 11 separately receives beacon frames of the AP 1 and the AP 2 to obtain values of k1 and k2, to obtain a value of a.

For another example, the STA 11 receives a beacon frame of the AP 1 to obtain a value of k1, or receives a beacon frame of the AP 2 to obtain a value of k2, and then measures the uplink coordinated trigger frames sent by the AP 1 and the AP 2 to obtain a value of k1+k2, to obtain a value of a.

For another example, before sending the uplink coordinated trigger frame, the AP 1 sends a frame carrying transmit power. The frame may be a frame specifically used for channel measurement, or may be a frame in an uplink coordination negotiation process. The STA 11 obtains a value of k1 through measurement based on the frame. Then the STA 11 measures the uplink coordinated trigger frames sent by the AP 1 and the AP 2 to obtain a value of k1+k2, to obtain a value of a.

For another example, before sending the uplink coordinated trigger frames, the AP 1 and the AP 2 separately send, at different time points, frames carrying transmit power. The STA 11 obtains values of k1 and k2 through measurement based on the two frames, to obtain a value of a.

It should be noted that separately sending a frame to measure k1 and k2 by the access point has the following advantages over the solution in which k1 and k2 are obtained through beacon frame measurement: The beacon frame is periodically sent, and a period is typically 0.1 second, or may be longer. In this case, a time interval between sending the uplink coordinated trigger frame and sending the beacon frame may be relatively long, resulting in relatively large changes in a signal attenuation coefficient. Consequently, calculated transmit power is inaccurate. Sending a measurement frame before the uplink coordinated trigger frame can ensure a quite short time interval between the measurement frame and the uplink coordinated trigger frame and few changes in the siganl attenuation coefficient. In this way, calculated transmit power is more accurate.

It is assumed that the AP 2 sends the uplink coordinated trigger frame at power P2, and P2=b×P0. P2 or the parameter b is carried in the uplink coordinated trigger frame or notified to the STA 11 through negotiation. A manner in which the STA 11 obtains a value of P2 or b is not limited in this embodiment.

$$Pr=k1 \times P0+k2 \times P2=(k1+k2 \times b) \times P0 \quad (4)$$

Assuming that k3=k2×b, $$Pr=(k1+k3) \times P0 \quad (5)$$

Assuming that a1=k3/k1, $$Pt=Ptar \times P0 \times (1+a1)/Pr \quad (6)$$

It is assumed that there are more than two APs in coordination, and each AP uses transmit power P0 when sending an uplink coordinated trigger frame. For example, a signal attenuation coefficient between an AP n and the STA 11 is kn.

$$Pr=(k1+k2+kn) \times P0 \quad (7)$$

Assuming that a2=(k2+ . . . kn)/k1, $$k1=Pr/(1+a2)/P0 \quad (8)$$

Further, the following formula is obtained:

$$Pt=Ptar \times P0 \times (1+a2)/Pr \quad (9)$$

It should be noted that a natural number is used for the attenuation coefficient in the descriptions of the method, and a form of a logarithm may be further used for calculating attenuation in the communication field. For details, refer to example descriptions in subsequent embodiments.

It can be learned from the foregoing example descriptions that, in this embodiment of this application, the STA may calculate transmit power of a TB PPDU in an uplink coordination mechanism of a plurality of APs, and can accurately calculate the transmit power of the TB PPDU. This resolves a problem that the transmit power of the TB PPDU cannot be calculated in the uplink coordination mechanism of a plurality of APs.

In other embodiments of this application, the transmit power of the TB PPDU may alternatively be calculated in the following manner. It can be learned from Formula (0) that Pr=k1×(1+a)×P0, where a is a changing value, for example, locations of the APs and a location of the STA affect a value of a. However, because a distance between the STA 11 and the associated access point AP 1 is shorter than a distance between the STA 11 and the AP 2, correspondingly, a received signal of the AP 1 is stronger than a signal of the AP 2 in a case of equal transmit power. Therefore, a is a decimal number between 0 and 1. A fixed parameter a may be set through measurement and statistics collection for typical scenarios. A plurality of stations use the fixed parameter to perform power calculation.

Assuming that 1+a=k, the following may be obtained:

$$Pr=k1 \times k \times P0 \quad (10)$$

Further, the following is obtained:

$$Pt=k \times P0 \times Ptar/Pr \quad (11)$$

The parameter a or k may be in a fixed form, in other words, specified in a communication protocol or standard. All coordination stations use the value to perform power calculation. The parameter a or k may alternatively be determined by the AP. The AP calculates a value of a or k based on information such as a location of the AP in a coordination set, and then sends the value to the coordination station. The coordination station uses the value to perform power calculation.

In this embodiment of this application, the station calculates the transmit power of the TB PPDU in the uplink coordination mechanism by using a fixed or semi-fixed parameter, so that a process of calculating the transmit power of the TB PPDU can be simplified.

In other embodiments of this application, a unit of the transmit power is a decibel relative to one milliwatt. The decibel relative to one milliwatt (decibel relative to one milliwatt, dBm) is an absolute value representing power, unlike a decibel (dB) that is a relative value. The decibel is a unit measuring a ratio of two quantities of same units.

In FIG. 20, when the AP 1 and the AP 2 simultaneously send trigger frames including same content, a signal received by the STA 11 is a signal obtained through superimposition of signals sent by the AP 1 and the AP 2. The station STA 11 cannot distinguish a part that comes from the AP 1, and therefore cannot calculate transmit power of a TB PPDU. This embodiment provides a method for calculating the transmit power of the TB PPDU by the STA 11, so that received power, at the AP 1, of a signal sent by the STA 11 is equal to received power that is estimated by the AP 1 and at which the TB PPDU sent by the STA 11 arrives at the AP 1.

Parameters involved in this embodiment of this application are described as follows:

$Tx_{pwr}^{AP}$ is transmit power used when the AP 1 sends the trigger frame;

$Target_{RSSI}$ is estimated received power at which the TB PPDU sent by the STA 11 arrives at the AP 1;

$DL_{RSSI}$ is a received power of the trigger frame at the STA 11;

$Tx_{pwr}^{STA}$ is the transmit power used when the STA 11 sends the TB PPDU;

$PL_{DL1}$ is a signal attenuation coefficient or a path loss coefficient between the AP 1 and the STA 11, where for example, uplink and downlink channels are peer channels, in other words, have a same attenuation coefficient; and $PL_{DL2}$ is a signal attenuation coefficient or a path loss coefficient between the AP 2 and the STA 11, where for example, uplink and downlink channels are peer channels, in other words, have a same attenuation coefficient.

First, it is assumed that the AP 2 and the AP 1 use same transmit power, because the two APs jointly send the trigger frames including same content, and the trigger frame includes only one AP transmit power setting parameter. A method for calculating $Tx_{pwr}^{STA}$ when the AP 1 and the AP 2 have different transmit power is subsequently described.

Because the STA 11 receives the signal obtained through superimposition of the signals of the AP 1 and the AP 2, $$10^{\wedge}(DL_{RSSI}/10)=10^{\wedge}((Tx_{pwr}^{AP}-PL_{DL1})/10)+ \\ 10^{\wedge}((Tx_{pwr}^{AP}-PL_{DL2})/10) \quad (e1)$$

$10^{\wedge}((Tx_{pwr}^{AP}-PL_{DL1})/10)$ in the formula represents 10 raised to the power of $((Tx_{pwr}^{AP}-PL_{DL1})/10)$.

The following is obtained after transformation:

$$PL_{DL1}=Tx_{pwr}^{AP}-DL_{RSSI}+10*\log_{10}(1+10^{\wedge}((PL_{DL1}-PL_{DL2})/10)) \quad (e2)$$

Assuming that m=10*$\log_{10}$(1+10^((PL_{DL1}-PL_{DL2})/10)), $$PL_{DL1}=Tx_{pwr}^{AP}-DL_{RSSI}+m \quad (e3)$$

After the STA 11 sends the TB PPDU, there is only the path loss $PL_{DL1}$ for received power of the AP 1. Herein, it is assumed that uplink and downlink path losses are the same. Therefore, $$Tx_{pwr}^{STA}=PL_{DL1}+\text{Target}_{RSSI} \tag{e4}$$

The following may be obtained by substituting Formula (e3) into (e4):

$$Tx_{pwr}^{STA}=Tx_{pwr}^{AP}-DL_{RSSI}+\text{Target}_{RSSI}+m \tag{e5}$$

A parameter m is used in Formula (e3), and may be obtained in a plurality of manners.

In an implementation, the AP may include transmit power in a to-be-sent beacon frame, and the STA 11 separately receives beacon frames of the AP 1 and the AP 2 to obtain values of $PL_{DL1}$ and $PL_{DL2}$, to obtain a value of m.

In another implementation, the STA 11 receives a beacon frame of the AP 1 to obtain a value of $PL_{DL1}$, or receives a beacon frame of the AP 2 to obtain a value of $PL_{DL2}$, and then measures the uplink coordinated trigger frames sent by the AP 1 and the AP 2 to obtain received power after signal superimposition, to obtain a value of m.

In another implementation, before sending the uplink coordinated trigger frame, the AP 1 sends a frame carrying transmit power. The frame may be a frame specifically used for channel measurement, or may be a frame in an uplink coordination negotiation process. The STA 11 obtains a value of $PL_{DL1}$ through measurement based on the frame. Then the STA 11 measures the uplink coordinated trigger frames sent by the AP 1 and the AP 2 to obtain received power after signal superimposition, to obtain a value of m.

In another implementation, before sending the uplink coordinated trigger frames, the AP 1 and the AP 2 separately send, at different time points, frames carrying transmit power. The STA 11 obtains values of $PL_{DL1}$ and $PL_{DL2}$ through measurement based on the two frames, to obtain a value of m.

It should be noted that, in the foregoing plurality of implementations, sending a frame to measure m has the following advantages over obtaining the value of m through beacon frame measurement: The beacon frame is periodically sent, and a period is typically 0.1 second, or may be longer. In this case, a time interval between sending the uplink coordinated trigger frame and sending the beacon frame may be relatively long, resulting in relatively large changes in a signal attenuation coefficient. Consequently, calculated transmit power is inaccurate. Sending a measurement frame before the uplink coordinated trigger frame can ensure a quite short time interval between the measurement frame and the uplink coordinated trigger frame and few changes in the signal attenuation coefficient. In this way, calculated transmit power is more accurate.

It is assumed that the AP 2 sends the uplink coordinated trigger frame at power $Tx_{pwr}^{AP2}$. $Tx_{pwr}^{AP2}$ is carried in the uplink coordinated trigger frame, notified to the STA 11 through negotiation, or the like. A manner in which the STA 11 obtains a value of $Tx_{pwr}^{AP2}$ is not limited in this embodiment.

$$10^{\wedge}(DL_{RSSI}/10)=10^{\wedge}((Tx_{pwr}^{AP}-PL_{DL1})/10)+ \\ 10^{\wedge}((Tx_{pwr}^{AP2}-PL_{DL2})/10) \tag{e6}$$

The following is obtained after transformation:

$$PL_{DL1}=Tx_{pwr}^{AP}-DL_{RSSI}+10*\log_{10}(1+10^{\wedge}((PL_{DL1}-PL_{DL2}-Tx_{pwr}^{AP}+Tx_{pwr}^{AP2})/10)) \tag{e7}$$

Assuming that $m1=10*\log_{10}(1+10^{\wedge}((PL_{DL1}-PL_{DL2}-Tx_{pwr}^{AP}+Tx_{pwr}^{AP2})/10))$, $$PL_{DL1}=Tx_{pwr}^{AP}-DL_{RSSI}+m1 \tag{e8}$$

The following may be obtained by substituting Formula (e8) into (e4):

$$Tx_{pwr}^{STA}=Tx_{pwr}^{AP}-DL_{RSSI}+\text{Target}_{RSSI}+m1 \tag{e9}$$

It is assumed that there are more than two APs in coordination, and each AP uses transmit power $Tx_{pwr}^{AP}$ when sending an uplink coordinated trigger frame. A signal attenuation coefficient between an AP n and the STA 11 is $PL_{DLn}$.

$$10^{\wedge}(DL_{RSSI}/10)=10^{\wedge}((Tx_{pwr}^{AP}-PL_{DL1})/10)+ \\ 10^{\wedge}((Tx_{pwr}^{AP}-PL_{DL2})/10)+\ldots+10^{\wedge}((Tx_{pwr}^{AP}-PL_{DLn})/10) \tag{e10}$$

The following is obtained after transformation:

$$PL_{DL1}=Tx_{pwr}^{AP}-DL_{RSSI}+10*\log_{10}(1+10^{\wedge}((PL_{DL1}-PL_{DL2})/10)+\ldots+10^{\wedge}((PL_{DL1}-PL_{DLn})/10)) \tag{e11}$$

Assuming that $m2=10*\log_{10}(1+10^{\wedge}((PL_{DL1}-PL_{DL2})/10)+\ldots+10^{\wedge}((PL_{DL1}-PL_{DLn})/10))$, $$PL_{DL1}=Tx_{pwr}^{AP}-DL_{RSSI}+m2 \tag{e12}$$

The following may be obtained by substituting Formula (e12) into (e4):

$$Tx_{pwr}^{AP}=Tx_{pwr}^{AP}-DL_{RSSI}+\text{Target}_{RSSI}+m2 \tag{e13}$$

In this embodiment, a unit of the transmit power is a decibel relative to one milliwatt dBm.

In other embodiments of this application, it can be learned from Formula (e3) that $PL_{DL1}=Tx_{pwr}^{AP}-DL_{RSSI}+m$, where m is a changing value, and locations of the APs and a location of the STA affect a value of m. However, because a distance between the STA 11 and the associated access point AP 1 is usually shorter than a distance between the STA 11 and the AP 2, correspondingly, a received signal of the AP 1 is stronger than a signal of the AP 2 in a case of equal transmit power. Therefore, a value range of m is 0 dB to 3 dB. A fixed parameter m may be set through measurement and statistics collection for typical scenarios. All stations use the fixed parameter to perform power calculation.

The parameter m may be in a fixed form, in other words, specified in a communication protocol. All coordination stations use the value to perform power calculation. The parameter m may alternatively be determined by the AP. The AP calculates a value of m based on information such as a location of the AP in a coordination set, and then sends the value to the coordination station. The coordination station uses the value to perform power calculation.

It can be learned from the foregoing example descriptions of Embodiment 3 that, in this embodiment of this application, the STA measures path loss information between the STA and both the associated AP and the coordination AP to compensate the transmit power of the TB PPDU, so that power at which the TB PPDU arrives at the associated AP is equal to the received power that is estimated by the AP 1 and at which the TB PPDU sent by the STA 11 arrives at the AP 1, thereby reducing a performance loss caused by inconsistent uplink arriving power of a plurality of STAs.

Figure 21:
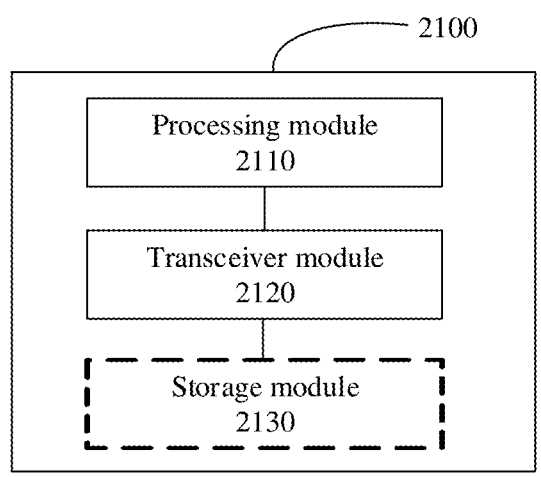
FIG. 21 is a schematic diagram of a composition structure of a first access point according to an embodiment of this application.

FIG. 21 is a schematic block diagram of a communication apparatus 2100 according to an embodiment of this application. In an embodiment, the apparatus 2100 shown in FIG. 21 may correspond to the communication apparatus in the foregoing method embodiments, and may have any function of the first access point or the STA in the method. Optionally, the apparatus 2100 in this embodiment of this application may be a first access point, or may be a chip in a first access point. The apparatus 2100 in this embodiment of this application may be a station, or may be a chip in a station. The apparatus 2100 may include a processing module 2110 and a transceiver module 2120. Optionally, the apparatus 2100 may further include a storage module 2130.

In an embodiment, the communication apparatus 2100 is a first access point or a chip in the first access point.

The processing module 2110 may be configured to generate signaling or data information sent in the foregoing method embodiments, for example, generate the trigger frame sent in step 301, and may be further configured to control, based on the trigger frame, the transceiver module 2120 to send the trigger frame to a STA, for example, may perform step 302. The processing module 2110 may be further configured to generate the PPDU in step 1801. The processing module 2110 may be further configured to generate the first trigger frame in step 1901.

The transceiver module 2120 is configured to support communication between the first access point AP, the station, and another node. It may be understood that the transceiver module may include a receiving module and a sending module. The sending module may be configured to perform step 302, step 1802, and step 1902 in the foregoing method embodiments.

In still another embodiment, the communication apparatus 2100 is a station or a chip in the station.

The processing module 2110 may parse and process the signaling or data information sent in the foregoing method embodiment, for example, notification information, for example, may perform step 306. The processing module 2110 may be further configured to generate signaling, for example, the trigger frame, sent in the foregoing embodiments. The processing module 2110 may further determine to perform step 312, step 1812, and step 1912 to step 1914 in the foregoing embodiments.

The transceiver module 2120 is configured to support communication between the station, a first AP, and another node. It may be understood that the transceiver module may include a receiving module and a sending module. The receiving module may be configured to perform step 311, step 1811, and step 1911 in the foregoing method embodiments.

It should be understood that the apparatus 2100 in this embodiment of this application may correspond to the first access point or the STA in the methods in the foregoing embodiments, and the foregoing and other management operations and/or functions of the modules in the apparatus 2100 are separately used to implement corresponding steps in the foregoing methods. For brevity, details are not described herein again.

Alternatively, the apparatus 2100 may be configured as a general processing system, which, for example, is generally referred to as a chip. The processing module 2110 may include one or more processors providing processing functions. The transceiver module 2120 may be, for example, an input/output interface, a pin, or a circuit. The input/output interface may be configured to be responsible for information interaction between the chip system and the outside. For example, the input/output interface may output transmission control information generated by the first access point (AP) to another module outside the chip for processing. The processing module may execute computer-executable instructions stored in the storage module, to implement functions of the first access point in the foregoing method embodiments. In an example, the storage module 2130 optionally included in the apparatus 2100 may be a storage unit in a chip, for example, a register or a buffer; or may be a storage unit outside the chip, for example, a read-only memory (ROM for short) or another type of static storage device, random access memory (RAM for short), or the like that can store static information and instructions.

Figure 22:
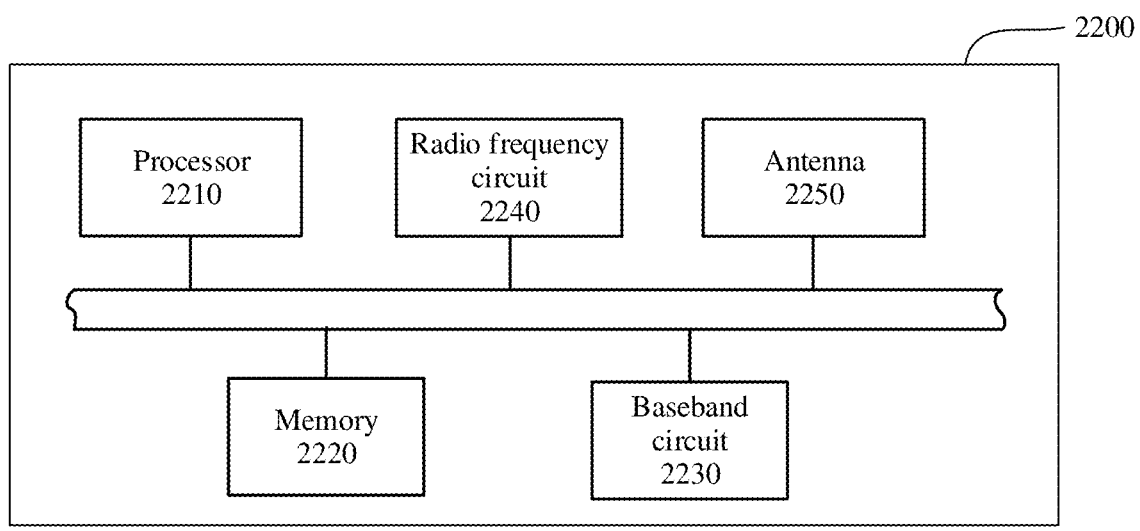
FIG. 22 is a schematic diagram of a composition structure of a station according to an embodiment of this application.

In another example, FIG. 22 is a schematic block diagram of another communication apparatus 2200 according to an embodiment of this application. The apparatus 2200 in this embodiment of this application may be the first access point or the STA in the foregoing method embodiments, and the apparatus 2200 may be configured to perform some or all functions of the first access point or the STA in the foregoing method embodiments. The apparatus 2200 may include a processor 2210, a baseband circuit 2230, a radio frequency circuit 2240, and an antenna 2250. Optionally, the apparatus 2200 may further include a memory 2220. Components of the apparatus 2200 are coupled together by using a bus. In addition to a data bus, the bus system further includes a power bus, a control bus, and a status signal bus. However, for clear description, various types of buses in the figure are marked as the bus system.

The processor 2210 may be configured to control the first access point or the STA, and is configured to perform processing performed by the first access point or the STA in the foregoing embodiments. The processor 2210 may perform a processing process related to the first access point or the STA in the foregoing method embodiments and/or other processes of the technology described in this application, and may further run an operating system. The processor 2210 is responsible for managing a bus, and may execute a program or instructions stored in the memory.

The baseband circuit 2230, the radio frequency circuit 2240, and the antenna 2250 may be configured to support the first access point and the second access point or station in the foregoing embodiments in receiving and sending information, to support wireless communication between the first access point and another node. For example, the processor 2210 may process transmission control information sent by the first access point; the baseband circuit 2230 performs baseband processing, such as protocol-based encapsulation and encoding, on processed transmission control information; and the radio frequency circuit 2240 further performs radio frequency processing, such as analog conversion, filtering, amplification, and up-conversion, on baseband processed transmission control information, and then sends radio frequency processed transmission control information to the second access point AP via the antenna 2250. It may be understood that the baseband circuit 2230, the radio frequency circuit 2240, and the antenna 2250 may be further configured to support communication between the first access point and another network entity.

The memory 2220 may be configured to store program code and data of the first access point or the STA, and the memory 2220 may be the storage module 2130 in FIG. 21. In FIG. 22, the memory 2220 is separated from the processor 2210. However, a person skilled in the art easily understands that the memory 2220 or any part of the memory 2220 may be outside the apparatus 2200. For example, the memory 2220 may include a transmission line and/or a computer product separated from a wireless node, and these media may be accessed by the processor 2210 through a bus interface. Alternatively, the memory 2220 or any part of the memory 2220 may be integrated into the processor 2210, for example, may be a cache and/or a general-purpose register.

In an example, the transceiver module 2120 in FIG. 21 may include the baseband circuit 2230, the radio frequency circuit 2240, and the antenna 2250, and the processing module 2110 may be the processor 2210. In another example, the transceiver module 2120 in FIG. 21 may include only the antenna in FIG. 22, and the processing module 2110 may include the processor 2210, the radio frequency circuit 2240, and the baseband circuit 2230. In still another example, the processing module 2110 in FIG. 21 may include the processor 2210 and the baseband circuit 2230, and the transceiver module 2120 may include the radio frequency circuit 2240 and the antenna 2250.

It may be understood that FIG. 22 shows only a simplified design of the first access point or the STA. For example, in an actual application, the first access point or the STA may include any quantity of transmitters, receivers, processors, memories, and the like, and all first access points or STAs that can implement embodiments of this application fall within the protection scope of embodiments of this application.

An embodiment of this application further provides a computer storage medium. The computer-readable storage medium stores instructions, and the instructions may be executed by one or more processors of a processing circuit. When the instructions are run on a computer, the computer is enabled to perform the methods in the foregoing aspects.

An embodiment of this application further provides a chip system. The chip system includes a processor, configured to support a distributed unit, a centralized unit, and a first access point in implementing functions in any one of the foregoing embodiments, for example, generating or processing data and/or information in the foregoing methods.

In a possible design, the chip system may further include a memory, and the memory is configured to store program instructions and data that are necessary for the distributed unit, the centralized unit, and the first access point. The chip system may include a chip, or may include a chip and another discrete component.

An embodiment of this application further provides a processor. The processor is configured to: be coupled to a memory, to perform the method and the functions of the first access point AP in any one of the foregoing embodiments.

An embodiment of this application further provides a processor. The processor is configured to be coupled to a memory, to perform the method and the functions of the STA in any one of the foregoing embodiments.

An embodiment of this application further provides a computer program product including instructions. When the computer program product runs on a computer, the computer is enabled to perform the method and the functions of the first access point AP in any one of the foregoing embodiments.

An embodiment of this application further provides a computer program product including instructions. When the computer program product runs on a computer, the computer is enabled to perform the method and the functions of the STA in any one of the foregoing embodiments.

An embodiment of this application further provides a wireless communication system. The system includes the first access point, the at least one second access point, and the at least one STA in the foregoing embodiments.

All or some of the foregoing embodiments may be implemented by using software, hardware, firmware, or any combination thereof. When the software is used to implement embodiments, all or some of embodiments may be implemented in a form of a computer program product. The computer program product includes one or more computer instructions. When the computer program instructions are loaded and executed on the computer, the procedures or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk), or the like.

The invention claimed is:

1. A communication apparatus comprising:
a non-transitory memory configured to store non-transitory instructions; and
one or more processors coupled with the non-transitory memory, wherein the one or more processors are configured to execute the non-transitory instructions to thereby cause the communication apparatus to:
generate a trigger frame, wherein the trigger frame is useable to trigger each station of a plurality of stations in a plurality of basic service sets to send a corresponding trigger based physical protocol data unit, and the trigger frame comprises identification information of the plurality of basic service sets and identification information of the plurality of stations; and
send the trigger frame to the stations;
wherein the trigger frame comprises a first field and a first user information field corresponding to the first field,
wherein the first field comprises identification information of at least one of the plurality of basic service sets;
the first user information field comprises identification information of one triggered station of at least one basic service set of the plurality of basic service sets; and
the first user information field is located after the first field in the trigger frame;
the first field is included in a second user information field in the trigger frame;
the at least one basic service set of the plurality of basic service sets fails to comprise a first basic service set corresponding to the first access point, and the first field is located after the first user information field corresponding to the first basic service set in the trigger frame in response to the first field being included in the second user information field in the trigger frame.

2. The communication apparatus according to claim 1, wherein
the identification information of the plurality of basic service sets comprises at least one of:
a basic service set color of each corresponding basic service set of the plurality of basic service sets,
an access point identifier of each corresponding basic service set of the plurality of basic service sets,
a basic service set identifier of each corresponding basic service set of the plurality of basic service sets, or
a medium access control (MAC) address of each corresponding access point of a plurality of access points of each corresponding basic service set of the plurality of basic service sets; and the identification information of the plurality of stations comprises association identifiers of the plurality of stations.

3. The communication apparatus according to claim 1, wherein the trigger frame comprises a plurality of first fields and at least one first user information field corresponding to each first field of the plurality of first fields, respectively.

4. A communication apparatus comprising:

a non-transitory memory configured to store non-transitory instructions; and one or more processors coupled with the non-transitory memory, wherein the one or more processors are configured to execute the non-transitory instructions to thereby cause the communication apparatus to:

generate a trigger frame, wherein the trigger frame is useable to trigger each station of a plurality of stations in a plurality of basic service sets to send a corresponding trigger based physical protocol data unit, and the trigger frame comprises identification information of the plurality of basic service sets and identification information of the plurality of stations; and send the trigger frame to the stations;

wherein the trigger frame comprises a first field and a first user information field corresponding to the first field, wherein the first field comprises identification information of at least one of the plurality of basic service sets;

the first user information field comprises identification information of one triggered station of at least one basic service set of the plurality of basic service sets; and the first user information field is located after the first field in the trigger frame;

the first field is included in a common information field in the trigger frame;

wherein the common information field comprises a trigger type subfield and a trigger dependent common information subfield in response to the first field being included in the common information field in the trigger frame, wherein the trigger type subfield indicates a trigger type of the trigger frame; and the trigger dependent common information subfield comprises the first field.

5. A communication apparatus comprising:

a non-transitory memory configured to store non-transitory instructions; and one or more processors coupled with the non-transitory memory, wherein the one or more processors are configured to execute the non-transitory instructions to thereby cause the communication apparatus to:

generate a trigger frame, wherein the trigger frame is useable to trigger each station of a plurality of stations in a plurality of basic service sets to send a corresponding trigger based physical protocol data unit, and the trigger frame comprises identification information of the plurality of basic service sets and identification information of the plurality of stations; and send the trigger frame to the stations;

wherein the trigger frame comprises a first field and a first user information field corresponding to the first field, wherein the first field comprises identification information of at least one of the plurality of basic service sets;

the first user information field comprises identification information of one triggered station of at least one basic service set of the plurality of basic service sets; and the first user information field is located after the first field in the trigger frame;

wherein the first field is included in a coordinated field in the trigger frame;

wherein the trigger frame further comprises a common information field in response to the first field being included in the coordinated field in the trigger frame, wherein the common information field indicates a trigger type of the trigger frame, and the coordinated field is located after the common information field in the trigger frame.

6. A communication apparatus comprising:

a non-transitory memory configured to store non-transitory instructions; and one or more processors coupled with the non-transitory memory, wherein the one or more processors are configured to execute the non-transitory instructions to thereby cause the communication apparatus to:

generate a trigger frame, wherein the trigger frame is useable to trigger each station of a plurality of stations in a plurality of basic service sets to send a corresponding trigger based physical protocol data unit, and the trigger frame comprises identification information of the plurality of basic service sets and identification information of the plurality of stations; and send the trigger frame to the stations;

wherein the trigger frame comprises a first field and a first user information field corresponding to the first field, wherein the first field comprises identification information of at least one of the plurality of basic service sets;

the first user information field comprises identification information of one triggered station of at least one basic service set of the plurality of basic service sets; and the first user information field is located after the first field in the trigger frame;

the first field further comprises at least one basic service set identifier subfield, and the at least one basic service set identifier subfield indicates identification information of the at least one basic service set of the plurality of basic service sets;

wherein the at least one basic service set identifier subfield is a first value, and the first value indicates that the first field fails to comprise a basic service set identifier subfield after the basic service set identifier subfield whose value is the first value.

7. The communication apparatus according to claim 6, wherein the first value is a sequence of all 0s or all 1s.

8. A communication apparatus comprising:

a non-transitory memory configured to store non-transitory instructions; and one or more processors coupled with the non-transitory memory, wherein the one or more processors are configured to execute the non-transitory instructions to thereby cause the communication apparatus to:

generate a trigger frame, wherein the trigger frame is useable to trigger each station of a plurality of stations in a plurality of basic service sets to send a corresponding trigger based physical protocol data unit, and the trigger frame comprises identification information of the plurality of basic service sets and identification information of the plurality of stations; and send the trigger frame to the stations;

wherein the trigger frame comprises a first field and a first user information field corresponding to the first field, wherein the first field comprises identification information of at least one of the plurality of basic service sets;

the first user information field comprises identification information of one triggered station of at least one basic service set of the plurality of basic service sets; and the first user information field is located after the first field in the trigger frame;

the first field further comprises at least one number of user information subfield, and the at least one number of user information subfield indicates a quantity of first user information fields corresponding to the at least one basic service set of the plurality of basic service sets;

wherein the at least one number of user information subfield is a second value, and the second value indicates that the first field fails to comprise a number of user information subfield after the number of user information subfield whose value is the second value.

9. The communication apparatus according to claim 8, wherein the second value is a sequence of all 0s or all 1s.

10. A communication apparatus comprising:

a non-transitory memory configured to store non-transitory instructions; and one or more processors coupled with the non-transitory memory, wherein the one or more processors are configured to execute the non-transitory instructions to thereby cause the communication apparatus to:

generate a trigger frame, wherein the trigger frame is useable to trigger each station of a plurality of stations in a plurality of basic service sets to send a corresponding trigger based physical protocol data unit, and the trigger frame comprises identification information of the plurality of basic service sets and identification information of the plurality of stations; and send the trigger frame to the stations;

wherein the trigger frame comprises a first field and a first user information field corresponding to the first field, wherein the first field comprises identification information of at least one of the plurality of basic service sets;

the first user information field comprises identification information of one triggered station of at least one basic service set of the plurality of basic service sets; and the first user information field is located after the first field in the trigger frame;

wherein the first field is included in a second user information field in the trigger frame;

wherein the first field comprises an association identifier subfield in response to the first field being included in the second user information field in the trigger frame, wherein the association identifier subfield indicates a type of the first field, and a value of the association identifier subfield is a specific association identifier.

11. The communication apparatus according to claim 1 wherein the first field further comprises a number of basic service set subfield, and the number of basic service set subfield indicates a quantity of the at least one basic service set of the plurality of basic service sets.

* * * * *